United States Patent
Wentzlaff et al.

(10) Patent No.: US 7,624,248 B1
(45) Date of Patent: *Nov. 24, 2009

(54) MANAGING MEMORY IN A PARALLEL PROCESSING ENVIRONMENT

(75) Inventors: David Wentzlaff, Cambridge, MA (US); Anant Agarwal, Weston, MA (US)

(73) Assignee: Tilera Corporation, Westborough, MA (US)

( * ) Notice: Subject to any disclaimer, the term of this patent is extended or adjusted under 35 U.S.C. 154(b) by 574 days.

This patent is subject to a terminal disclaimer.

(21) Appl. No.: 11/404,187

(22) Filed: Apr. 14, 2006

(51) Int. Cl.
*G06F 12/06* (2006.01)

(52) U.S. Cl. .................. 711/202; 711/135; 712/18; 712/11

(58) Field of Classification Search .......... 711/135, 711/202, 203, 154, 137, 133, 128, 130, 129, 711/170; 712/11, 10, 14, 19, 18, 15
See application file for complete search history.

(56) References Cited

U.S. PATENT DOCUMENTS

| | | | |
|---|---|---|---|
| 4,491,911 | A | 1/1985 | Sato |
| 4,716,523 | A | 12/1987 | Burrus, Jr. et al. |
| 4,878,166 | A | 10/1989 | Johnson et al. |
| 6,973,484 | B1 | 12/2005 | Singhal et al. |
| 7,394,288 | B1 | 7/2008 | Agarwal |
| 7,461,236 | B1 | 12/2008 | Wentzlaff |
| 2004/0250046 | A1 | 12/2004 | Gonzalez et al. |
| 2004/0268286 | A1 * | 12/2004 | New et al. ............... 716/14 |
| 2006/0179429 | A1 | 8/2006 | Eggers et al. |

FOREIGN PATENT DOCUMENTS

WO WO 2004/072796 A2 2/2004

OTHER PUBLICATIONS

Agarwal, Anant. "Raw Computation," *Scientific American* vol. 281, No. 2: 44-47, Aug. 1999.
Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.
Taylor, Michael Bedford et. al., "Scalar Operand Networks: On-Chip Interconnect for ILP in Partitioned Architectures," *Proceedings of the International Symposium on High Performance Computer Architecture*, Feb. 2003.
Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.
Taylor, Michael Bedford et. al., "The Raw Microprocessor: A Computational Fabric for Software Circuits and General-Purpose Programs," *IEEE Micro*, pp. 25-35, Mar.-Apr. 2002.

(Continued)

*Primary Examiner*—Pierre-Michel Bataille
(74) *Attorney, Agent, or Firm*—Fish & Richardson P.C.

(57) ABSTRACT

An integrated circuit comprises a plurality of tiles. Each tile comprises: a processor, a switch including switching circuitry to forward data received over data paths from other tiles to the processor and to switches of other tiles, and to forward data received from the processor to switches of other tiles, according to a switch instruction indicating an input port to which each of multiple output ports of the switch is to be coupled, and a translation lookaside buffer coupled to the switch to translate virtual memory addresses of switch instructions to physical memory addresses of the switch instructions.

49 Claims, 22 Drawing Sheets

OTHER PUBLICATIONS

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35$^{th}$ International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barna, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

U.S. Examiner Anh Q. Tran, USPTO Non-Final Office Action in U.S. Appl. No. 12/130,462, mailed Mar. 3, 2009, 8 pages.

U.S Examiner Pierre Miche Bataille, USPTO Non-Final Office Action in U.S. Appl. No. 11/404,655, mailed Mar. 23, 2009, 14 pages.

U.S. Examiner Keith E. Vicary, USPTO Final Office Action in U.S. Appl. No. 11/302,956, mailed Oct. 18, 2007, 53 pages.

Fish & Richardson P.C., Patent Application (unpublished) in U.S. Appl. No. 11/302,956, filed Dec. 13, 2005, 68 pages.

* cited by examiner

MANAGING MEMORY IN A PARALLEL PROCESSING ENVIRONMENT

CROSS-REFERENCE TO RELATED APPLICATIONS

This application is related to U.S. Application Ser. No. 11/404,958 titled "MANAGING DATA IN A PARALLEL PROCESSING ENVIRONMENT," U.S. Application Ser. No. 11/404,658 titled "COUPLING DATA IN A PARALLEL PROCESSING ENVIRONMENT," U.S. Application Ser. No. 11/404,409 titled "COUPLING INTEGRATED CIRCUITS IN A PARALLEL PROCESSING ENVIRONMENT," U.S. Application Ser. No. 11/404,461 titled "PROTECTION IN A PARALLEL PROCESSING ENVIRONMENT," U.S. Application Ser. No. 11/404,281 titled "DIRECTING DATA IN A PARALLEL PROCESSING ENVIRONMENT," U.S. Application Ser. No. 11/404,654 titled "MANAGING CACHE MEMORY," U.S. Application Ser. No. 11/404,655 titled "MANAGING MEMORY ACCESS IN A PARALLEL PROCESSING ENVIRONMENT," U.S. Application Ser. No. 11/404,641 titled "MANAGING CACHE MEMORY IN A PARALLEL PROCESSING ENVIRONMENT," U.S. Application Ser. No. 11/404,207 titled "MAPPING MEMORY IN A PARALLEL PROCESSING ENVIRONMENT," U.S. Application Ser. No. 11/404,970 titled "MANAGING DEVICE ACCESS IN A PARALLEL PROCESSING ENVIRONMENT," each of which is being filed concurrently with the present application, and each of which is also incorporated herein by reference.

BACKGROUND

The invention relates to managing data in a parallel processing environment.

FPGAs (Field Programmable Gate Arrays) and ASICs (Application Specific Integrated Circuits) are two exemplary approaches for implementing customized logic circuits. An ASIC is designed for a specific application. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular in the late 1990s. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs are typically power hungry and their performance can be 10 to 20 times worse than that of an ASIC.

The MIT Raw integrated circuit design provides reconfigurability of an FPGA along with the performance and capability of an ASIC. The Raw Design is an example of a tiled integrated circuit with a computational substrate as described for example, in "Baring It All to Software: RAW Machines" IEEE Computer, September 1997, pp. 86-93.

SUMMARY

In one aspect, in general, the invention features an integrated circuit, comprising: a plurality of tiles. Each tile comprises: a processor, a switch including switching circuitry to forward data received over data paths from other tiles to the processor and to switches of other tiles, and to forward data received from the processor to switches of other tiles, according to a switch instruction indicating an input port to which each of multiple output ports of the switch is to be coupled, and a translation lookaside buffer coupled to the switch to translate virtual memory addresses of switch instructions to physical memory addresses of the switch instructions.

Aspects of the invention can include one or more of the following features.

Each tile further comprises a translation lookaside buffer coupled to the processor to translate virtual memory addresses of processor instructions to physical memory addresses of the processor instructions.

The processor is a pipelined processor and the switching circuitry is coupled to a plurality of stages of the pipeline.

The switching circuitry is coupled to bypass paths that connect non-adjacent pipeline stages of the processor.

The switching circuitry is coupled to a buffer accessible by the processor.

The switching circuitry is coupled to a buffer accessible within a register name space of the processor.

The switching circuitry is coupled to a buffer accessible within a memory address space of the processor.

The switching circuitry is coupled to a buffer accessible within an input/output device name space of the processor.

The buffer comprises an input buffer configured to receive data over an input port of the switch.

The buffer comprises an output buffer configured to send data over an output port of the switch.

In another aspect, in general, the invention features a method for processing instructions in an integrated circuit, the integrated circuit comprising a plurality of tiles, each tile comprising a processor and a switch. The method comprises: processing instructions in a processor of a tile; forwarding data received over data paths from other tiles to the processor and to switches of other tiles, and forwarding data received from the processor to switches of other tiles, according to a switch instruction indicating an input port to which each of multiple output ports of the switch is to be coupled; and translating virtual memory addresses of switch instructions to physical memory addresses of the switch instructions.

In another aspect, in general, the invention features an integrated circuit, comprising a plurality of tiles. Each tile comprises a processor, a switch including switching circuitry to forward data received over data paths from other tiles to the processor and to switches of other tiles, and to forward data received from the processor to switches of other tiles, and a memory interface coupled to at least one of the processor and the switch, configured to combine partial memory addresses to provide a physical memory address in a first mode, and configured to translate a virtual memory address to a physical memory address in a second mode.

Aspects of the invention can include one or more of the following features.

Combining partial memory addresses to provide a physical memory address comprises concatenating low order bits with high order bits to provide a physical memory address.

The low order bits comprise a virtual memory address.

The memory interface comprises a translation lookaside buffer configured to store information for translating a virtual memory address to a physical memory address.

The memory interface is configured to update information stored in the translation lookaside buffer in response to a translation fault.

The memory interface comprises a multiplexer configured to select a combined physical memory address or a translated physical memory address based on a signal indicating the first or the second mode.

In another aspect, in general, the invention features a method for processing instructions in an integrated circuit, the integrated circuit comprising a plurality of tiles, each tile comprising a processor and a switch. The method comprises: processing instructions in a processor of a tile; forwarding data received over data paths from other tiles to the processor and to switches of other tiles, and forwarding data received from the processor to switches of other tiles; and based on information indicating either a first mode or a second mode, combining a partial memory addresses to provide a physical memory address in the first mode, and translating a virtual memory address to a physical memory address in the second mode.

In another aspect, in general, the invention features an integrated circuit, comprising a plurality of tiles. Each tile comprises a processor, a switch including switching circuitry to forward data received over data paths from other tiles to the processor and to switches of other tiles, and to forward data received from the processor to switches of other tiles, a memory coupled to the processor, a cache manager including circuitry to transfer data between the memory and an external memory through the switch, and a direct memory access engine coupled to the processor and including circuitry to transfer data between the memory and the external memory through the switch.

Aspects of the invention can include one or more of the following features.

The switch comprises multiple switch points each including respective switching circuitry to forward data over respective data paths, and the cache manager and the direct memory access engine are coupled to a common switch point.

The common switch point is reserved for transferring data among memories of tiles and one or more external memories coupled to the tiles.

Switching circuitry for the common switch point is configured to forward data based at least in part on information included in the data to be forwarded.

The cache manager comprises a state machine configured to transfer cache lines between the memory and the external memory.

The direct memory access engine is configured to transfer multiple cache lines between the memory and the external memory.

The direct memory access engine is configured to transfer multiple cache lines in response to a request received from the processor.

The direct memory access engine is configured to fetch data from the external memory to the memory based on memory access history of the processor.

The direct memory access engine is configured to flush data from the memory to the external memory based on memory access history of the processor.

In another aspect, in general, the invention features a method for processing instructions in an integrated circuit, the integrated circuit comprising a plurality of tiles, each tile comprising a processor, a switch, and a memory coupled to the processor. The method comprises: processing instructions in a processor of a tile; forwarding data received over data paths from other tiles to the processor and to switches of other tiles, and forwarding data received from the processor to switches of other tiles; transferring data between the memory and an external memory through the switch according to a caching scheme to maintain a cache for the tile; and transferring data between the memory and the external memory through the switch according to a direct memory transfer scheme to transfer data while the processor is performing another task.

In another aspect, in general, the invention features an integrated circuit, comprising a plurality of tiles. Each tile comprises a processor, a switch including switching circuitry to forward data received over data paths from other tiles to the processor and to switches of other tiles, and to forward data received from the processor to switches of other tiles, local memory coupled to the processor, and a direct memory access engine including circuitry to transfer data between the local memory and memory of another tile through the switch.

Aspects of the invention can include one or more of the following features.

The integrated circuit further comprises an interface coupled to the processor and the direct memory access engine that enables the processor to identify data to be transferred by the direct memory access engine.

The interface comprises at least one register that is writable by the processor and readable by the direct memory access engine.

The direct memory access engine communicates with a direct memory access engine of the other tile to transfer the data.

The local memory and the memory of the other tile each include at least some memory locations configured as a cache for data from an external memory coupled to the tiles.

The transferred data comprises a cache line.

The direct memory access engine is configured to invalidate a cache line that is transferred to another tile.

The local memory comprises multiple memories configured as multiple levels in a multi-level cache.

The local memory is configured to update multiple levels when the processor writes data into the multi-level cache.

The direct memory access engine is configured to transfer data into a portion of the local memory configured to be protected from eviction by cached data from the external memory.

The direct memory access engine is configured to transfer data between the local memory and memory of the other tile after determining whether the transfer is allowed.

Determining whether the transfer is allowed comprises determining whether access to a source location of the data is allowed.

Determining whether the transfer is allowed comprises determining whether access to a destination location of the data is allowed.

Determining whether access to a destination location of the data is allowed comprises determining whether access to the memory of the other tile is allowed.

The direct memory access engine includes a buffer storing information identifying a plurality of tiles and information indicating whether access to an identified tile is allowed.

In another aspect, in general, the invention features a method for processing instructions in an integrated circuit, the integrated circuit comprising a plurality of tiles, each tile comprising a processor, a switch and a local memory coupled to the processor. The method comprises processing instructions in a processor of a tile; forwarding data received over data paths from other tiles to the processor and to switches of other tiles, and forwarding data received from the processor to switches of other tiles; and transferring data between the local memory and memory of another tile through the switch according to a direct memory transfer scheme to transfer data while the processor is performing another task.

In another aspect, in general, the invention features an integrated circuit, comprising a plurality of tiles. Each tile comprises: a processor, a switch including switching circuitry to forward data received over data paths from other tiles to the processor and to switches of other tiles, and to forward data received from the processor to switches of other tiles, a memory coupled to the processor, a direct memory access engine including circuitry to transfer data between the memory and a memory external to the tile through the switch, and a translation look-aside buffer coupled to the direct memory access engine to translate virtual memory addresses to physical memory addresses.

Aspects of the invention can include one or more of the following features.

The processor is a pipelined processor and the switching circuitry is coupled to a plurality of stages of the pipeline.

The switching circuitry is coupled to bypass paths that connect non-adjacent pipeline stages of the processor.

The switching circuitry is coupled to a buffer accessible by the processor.

The switching circuitry is coupled to a buffer accessible within a register name space of the processor.

The switching circuitry is coupled to a buffer accessible within a memory address space of the processor.

The switching circuitry is coupled to a buffer accessible within an input/output device name space of the processor.

The buffer comprises an input buffer configured to receive data over an input port of the switch.

The buffer comprises an output buffer configured to send data over an output port of the switch.

In another aspect, in general, the invention features a method for processing instructions in an integrated circuit, the integrated circuit comprising a plurality of tiles, each tile comprising a processor, a switch, and a memory coupled to the processor. The method comprises: processing instructions in a processor of a tile; forwarding data received over data paths from other tiles to the processor and to switches of other tiles, and forwarding data received from the processor to switches of other tiles; transferring data between the memory coupled to the processor and a memory external to the tile through the switch according to a direct memory transfer scheme to transfer data while the processor is performing another task; and translating virtual memory addresses to be transferred according to the direct memory access transfer scheme to physical memory addresses.

Aspects of the invention can have one or more of the following advantages.

Including a translation lookaside buffer (TLB) in a switch allows the switch instruction stream to be virtualized in a similar manner to processor instructions.

Direct memory access (DMA) transfers copy data from one memory space to another. By enabling the TLB to be used in DMA transfers, the DMA interface can function as a load/store interface, which facilitates operation of the compiler and operating system. DMA transfers allow data to be batched up and transferred without involving the processor in each word transmitted. Furthermore, when DMA transfers use only free cache cycles (i.e., the processor is not using the cache on that cycle), the DMA does not hamper performance of the processor. Furthermore, when a cache exists, some data can be present in the cache, while other data is in memory. Data present in the cache is in some cases accessed following a TLB access, so a DMA engine that is cache-integrated is also configured to use the TLB.

DMA transfers from one tile to another tile allows to the integrated circuit to save bandwidth on the pins to external memory. Cache to cache DMA transfer between tiles uses the TLB so that the information in the TLB can provide specify a target tile.

Other features and advantages of the invention will become apparent from the following description, and from the claims.

DESCRIPTION

1 Tiled Circuit Architecture Overview

Figure 1:
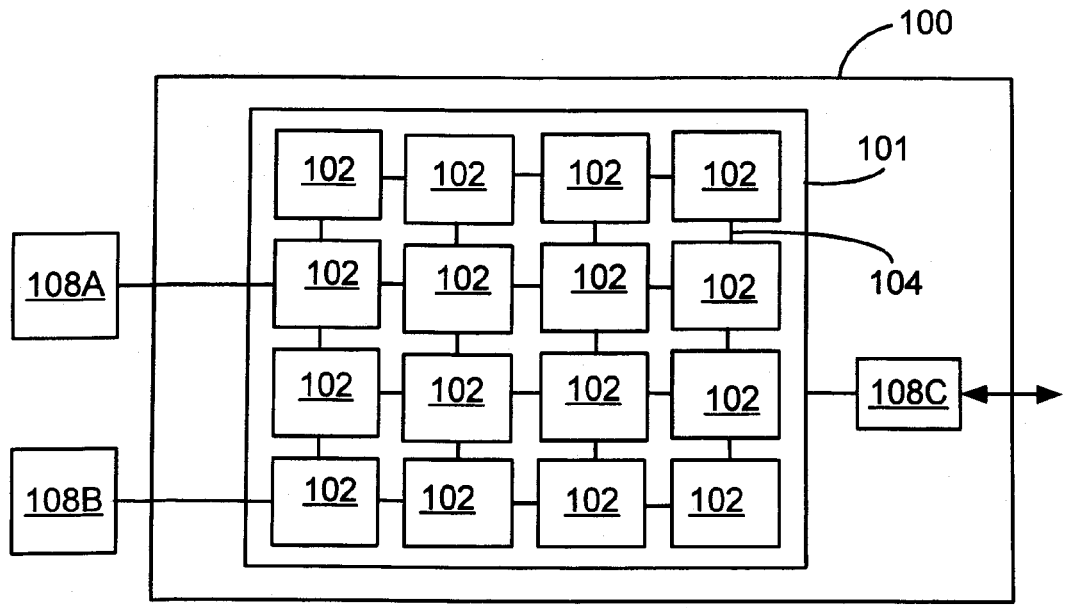
FIG. 1 is a block diagram of a tiled integrated circuit.

Referring to FIG. 1, an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles over the communication fabric formed by the switches and data paths. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 1 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the IC 100) to support parallel channels in each direction. Optionally, specific subsets of wires between the tiles can be dedicated to different mesh networks that can operate independently.

In some examples, the network include paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
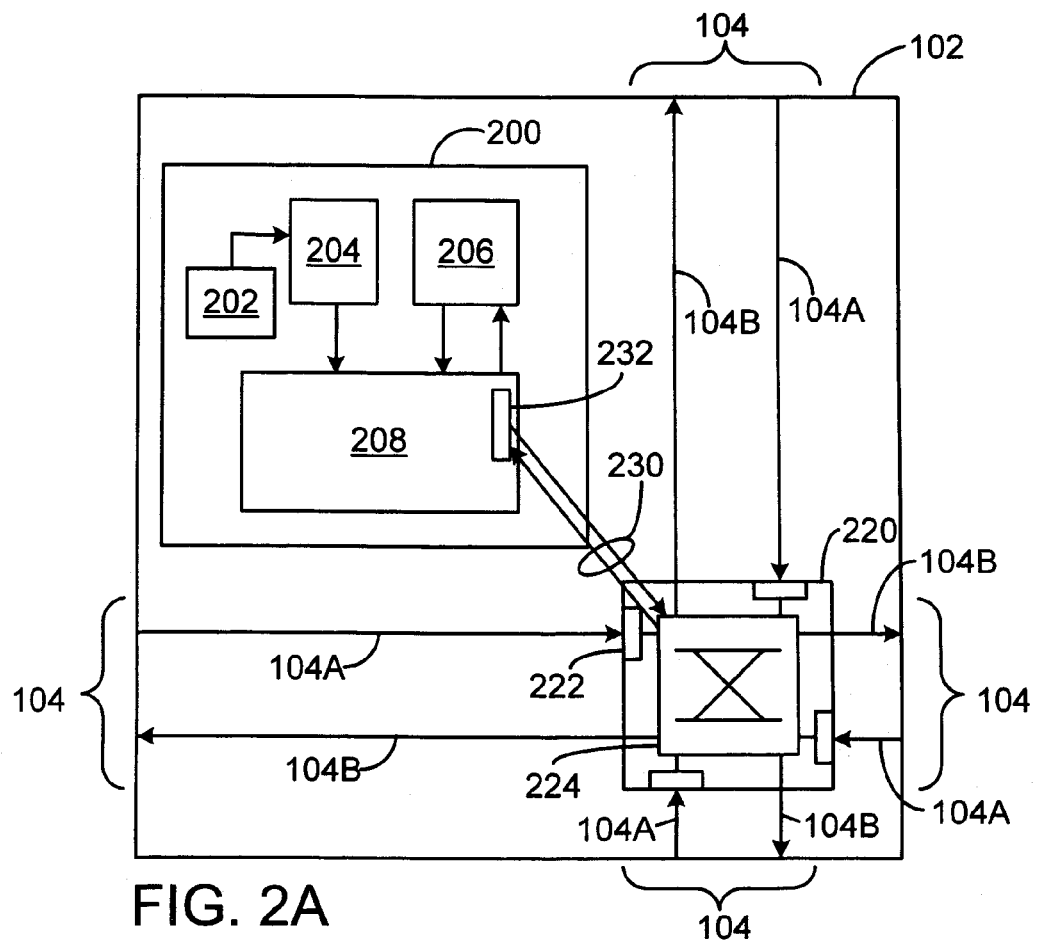
FIG. 2A is a block diagram of a tile.

Referring to FIG. 2A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit.

The processor 200 can be multithreaded and/or have capabilities of a Very Long Instruction Word (VLIW) processor, a superscalar processor, or a vector processor. A VLIW processor can issue multiple instructions based on a stream of macro instructions including subinstructions designated to be executed concurrently by a compiler. A superscalar processor can issue multiple instructions by partitioning one or more instruction stream at run time to multiple functional units. A vector processor can execute instructions using multiple functional units to operate on respective components of data. A multithreaded processor can execute multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on the a network port. In some examples, the processor 200 is a fine grain multithreaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

1.1 Switch Operation

Continuing to refer to FIG. 2A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (for example, in header information). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
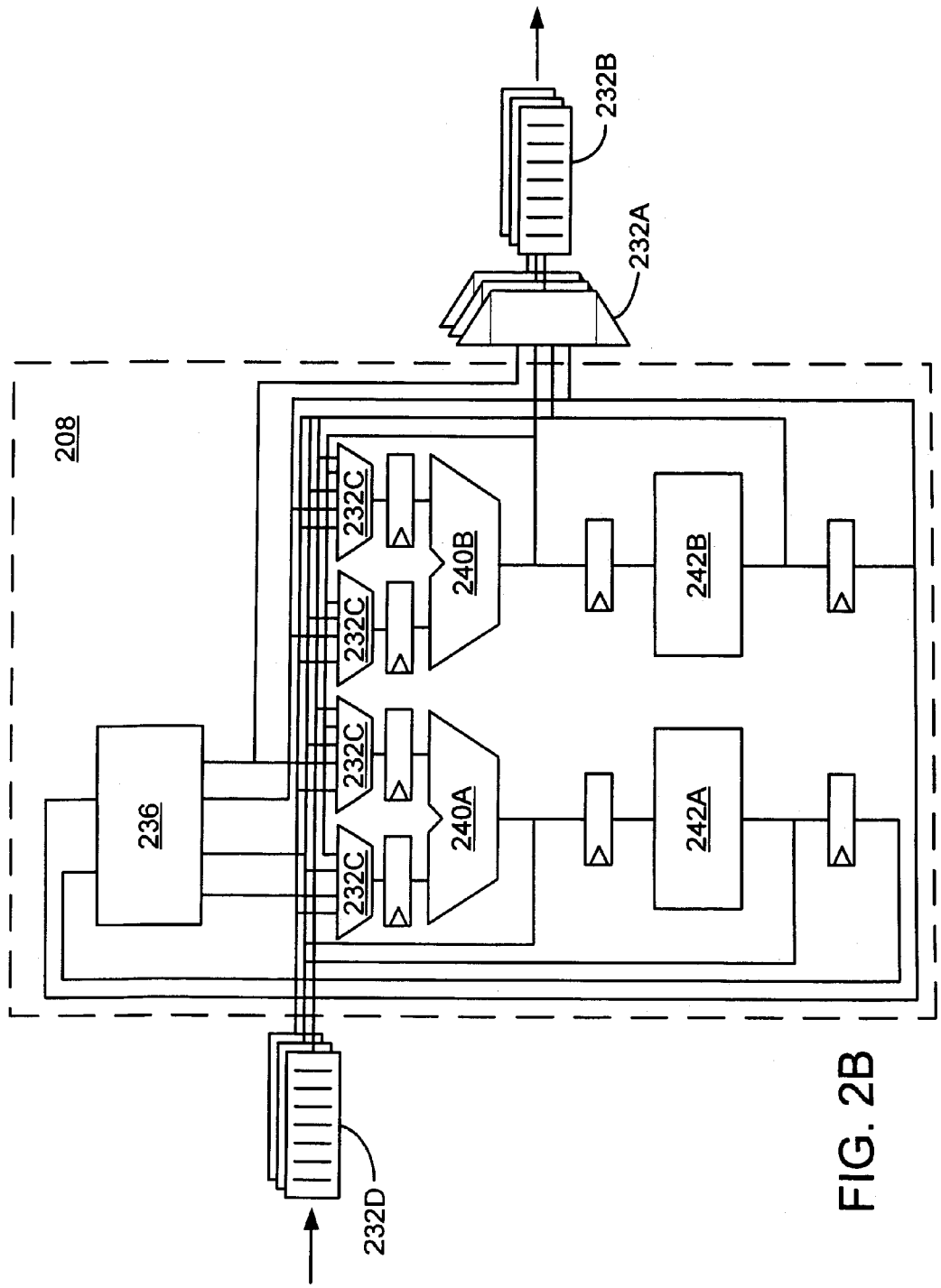
FIG. 2B is a block diagram of a pipeline.

Referring to FIG. 2B, a register mapped pipeline integrated switch interface 232 (FIG. 2A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (see FIG. 2A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
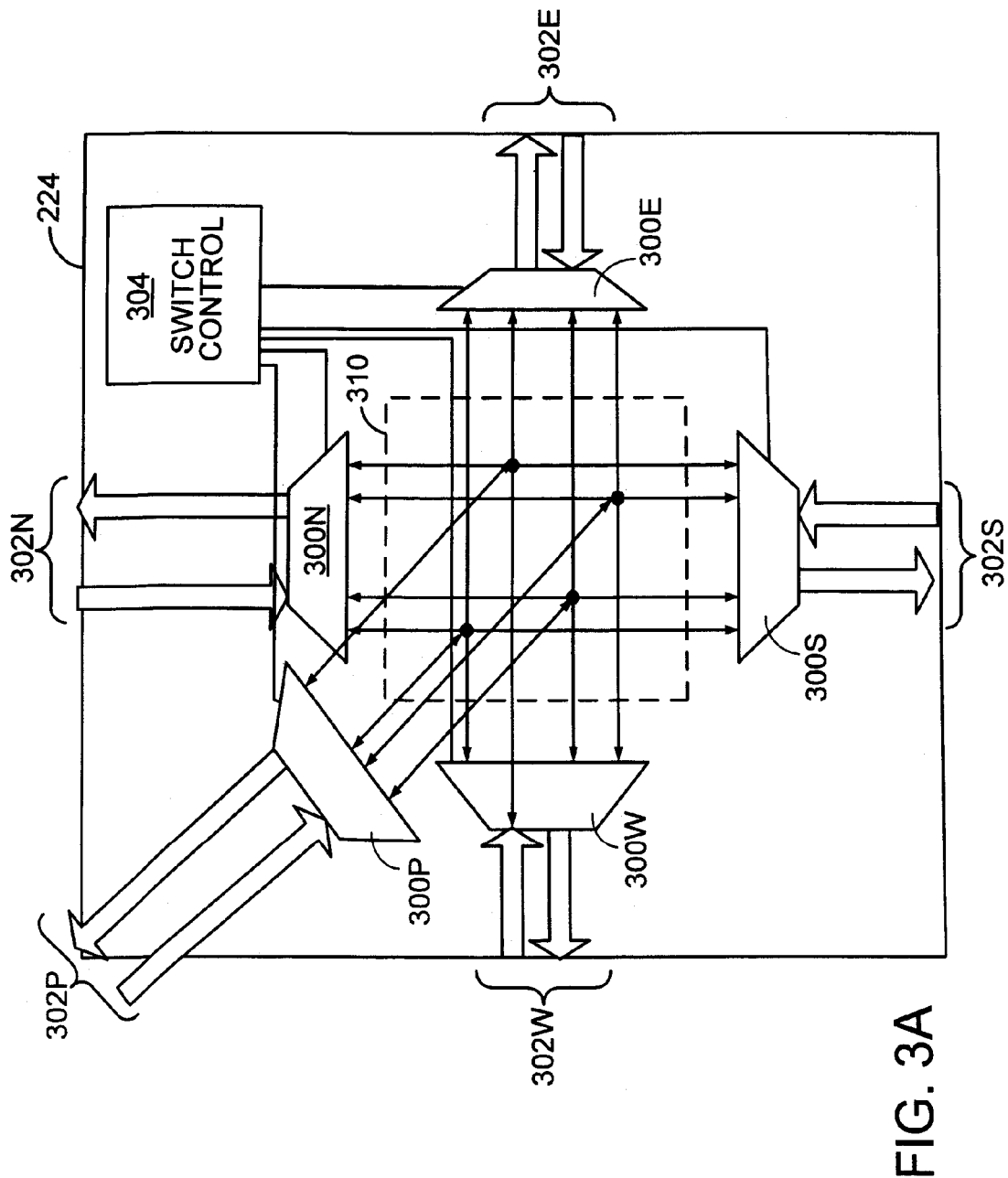
FIGS. 3A-3C are block diagrams of switching circuitry.

Referring to FIG. 3A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 3B:
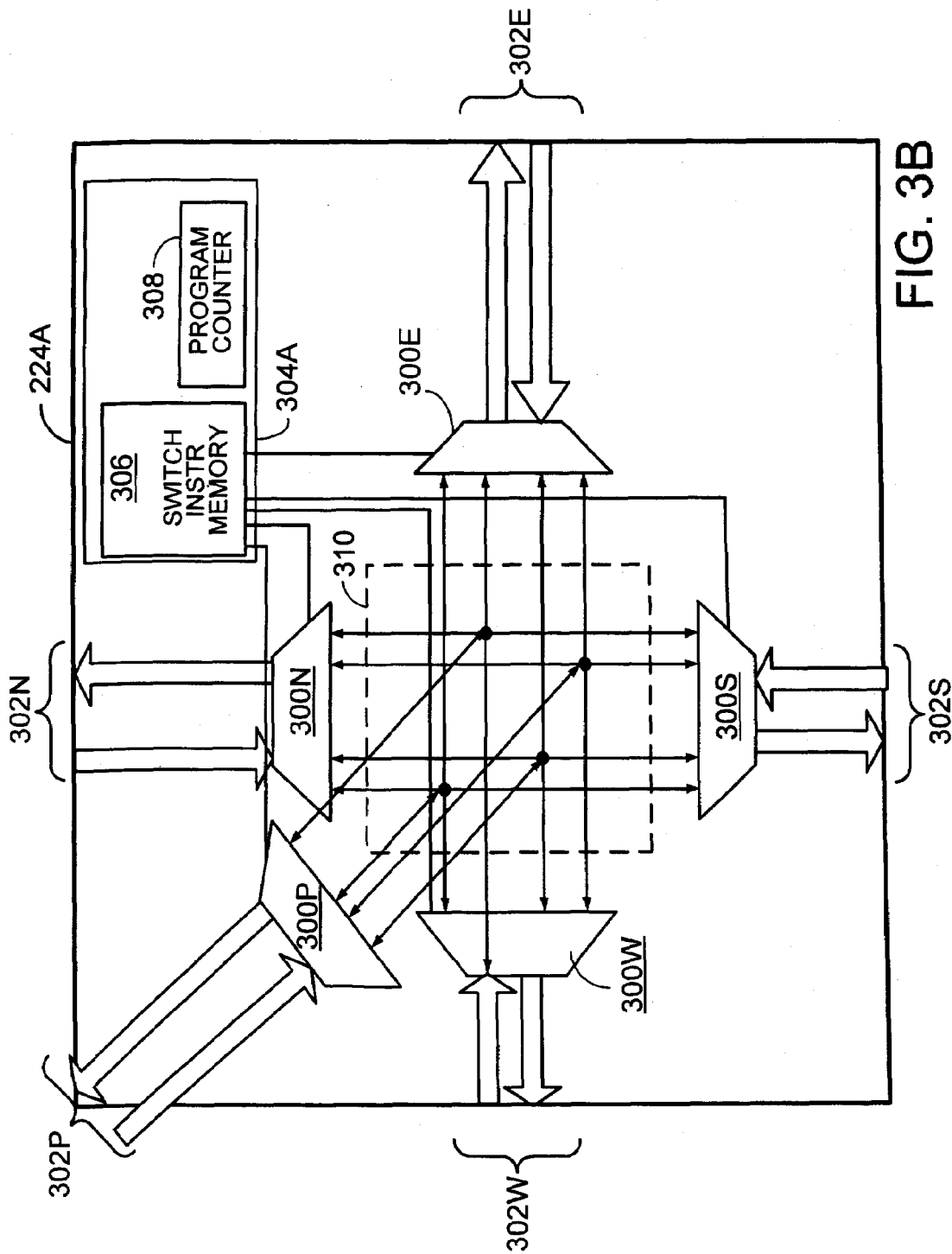

Referring to FIG. 3B, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples, the switch control module 304A can be a VLIW-type processor and can be multithreaded.

Figure 3C:
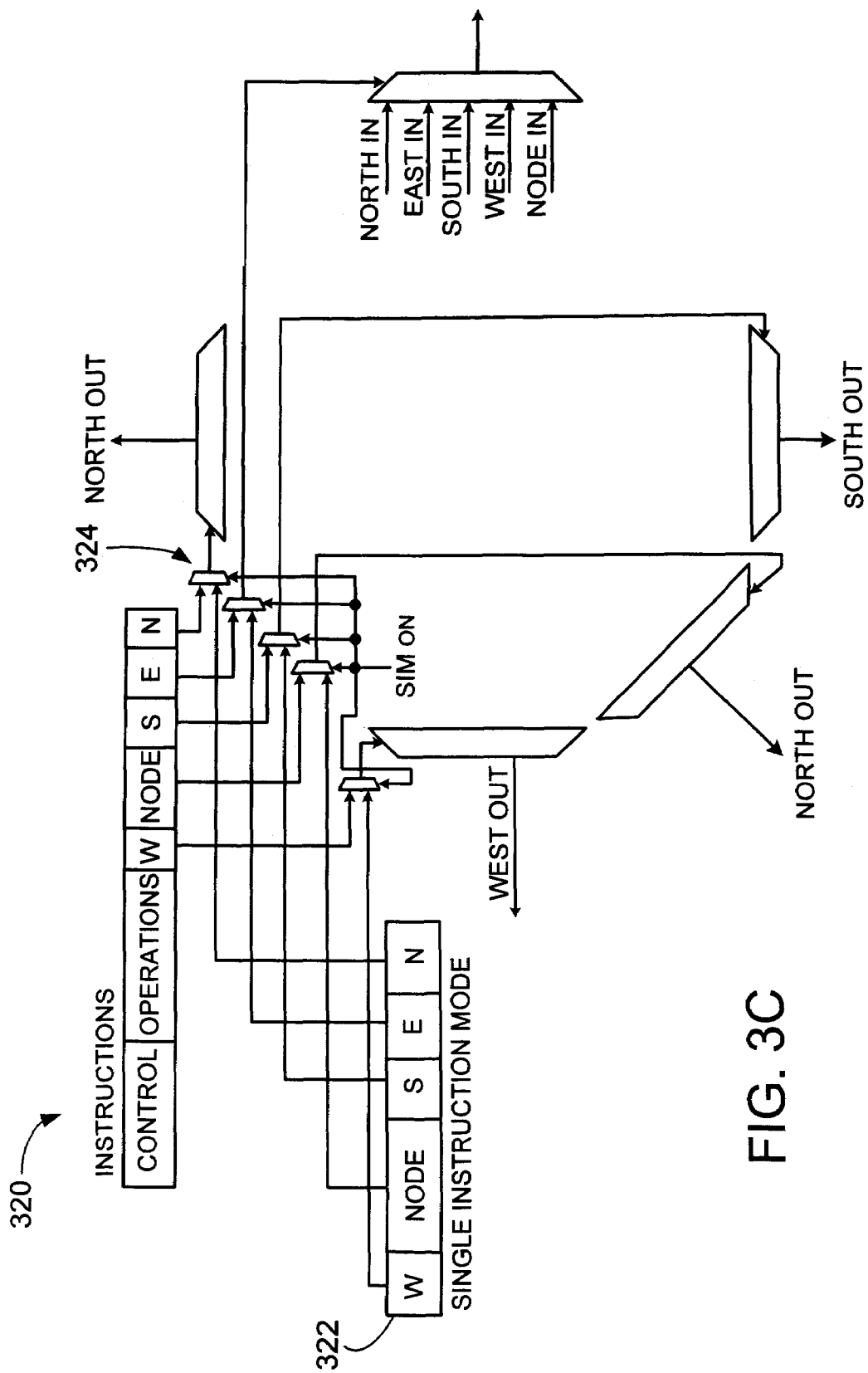

Referring to FIG. 3C, a static network switch 320, which can be included in switch 220 in FIG. 2A, is configured in "single instruction mode." In single instruction mode, one instruction is used to control the multiplexers of the switch over many cycles. When data arrives at one switch input port, that data is routed according to the instruction stored in the single instruction buffer 322 independent of the availability of data a the other switch input ports. In this example, the switch 320 includes multiplexers 324 for turning single instruction mode on or off. The control signals for the multiplexers 324 are controlled by the processor 200 (e.g., mapped to a register name space of the processor 200).

When single instruction mode is on, data is routed according to the single instruction buffer 322. When single instruction mode is off, data is routed according to instructions in the switch instruction buffer 346. To save power in single instruction mode, switches are able to turn off circuitry such as a switch instruction fetch unit, and a switch instruction decode logic. Power can also be saved by reducing the size of the single instruction buffer 322 (e.g., to the size of a single instruction). In some implementations the size of the single instruction buffer 322 can be reduced to only enough bits to represent the coupling between the input and output ports (e.g., 2, 3, or 4 bits).

When utilizing single instruction mode, the individual output directions are independent of each other and there are no synchronization requirements. For example, if the single instruction specifies a route from north to south and a route from east to west, and data arrives on the east port, but no data arrives on the north port, the switch will route the data from east to west independent of data being available on the north or ports. With multiple static switches configured to use single instruction mode, the static network can be utilized to construct a dedicated physical channel across the integrated circuit.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

1.2 Additional Circuitry

In some examples, a tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation lookaside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

More generally, the processor 200 is configured to delay committing data associated with a current instruction or a subsequent instruction to the switch until an operation associated with the current instruction or a previous instruction has completed. In a case in which a subinstruction within a VLIW instruction triggers a TLB access, the processor makes sure that the TLB access completes successfully before any of the subinstructions in the same VLIW instruction or future instructions are allowed to write into a network. For example, the processor ensures that the TLB access of a memory subinstruction is completed without the TLB suffering a fault, before any subsequent subinstruction (or subinstruction in the same instruction as the memory subinstruction) is allowed to write into a network port. If the TLB does suffer a fault, then subinstructions that are being executed in the same cycle as the TLB access are stalled. Similarly, instructions that are happening in later cycles will also be stalled until the TLB fault is handled successfully. For other subinstructions for which data is available to be sent over a network before the subinstruction is guaranteed to complete successfully, the processor delays sending the data over the network until the instruction completes or is guaranteed to complete successfully. The data may be included as part of the subinstruction (such as a virtual address) or in some way dependent on the execution of the subinstruction.

The processor 200 is also configured to allow certain instructions (or subinstructions) to proceed while waiting for a previous instruction to complete. For example, one type of instruction that may be delayed several cycles before completing is a load instruction that retrieves data from a memory address in an coupled memory device over the dynamic network (e.g., due to a cache miss or a non-cached memory access). In some cases the load instruction may also write the retrieved data to a network port. The processor 200 can execute certain subsequent instructions while the data is being retrieved without causing errors due to incorrect program order. However, if a subsequent instruction also writes to a network port, the processor stalls to prevent that instruction's data from being injected into the network before data from the previous load instruction.

Thus, one criterion used by the processor 200 to determine whether to stall a pipeline is to ensure that the order in which values enter a network port corresponds to the order of the instructions (or subinstructions). In some cases, instructions are allowed to proceed without stalling the pipeline due to an incomplete instruction (e.g., a load due to a cache miss that does not target a network port). In some cases, the pipeline is stalled preventing instructions that target a network port from proceeding until a previous instruction completes (e.g., a load due to a cache miss that also targets a network port). However, independent networks can be configured to not block each other. For example, being stalled on writing one network does not necessarily stall writing to another network.

2 Tiled Circuit Programming Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 4:
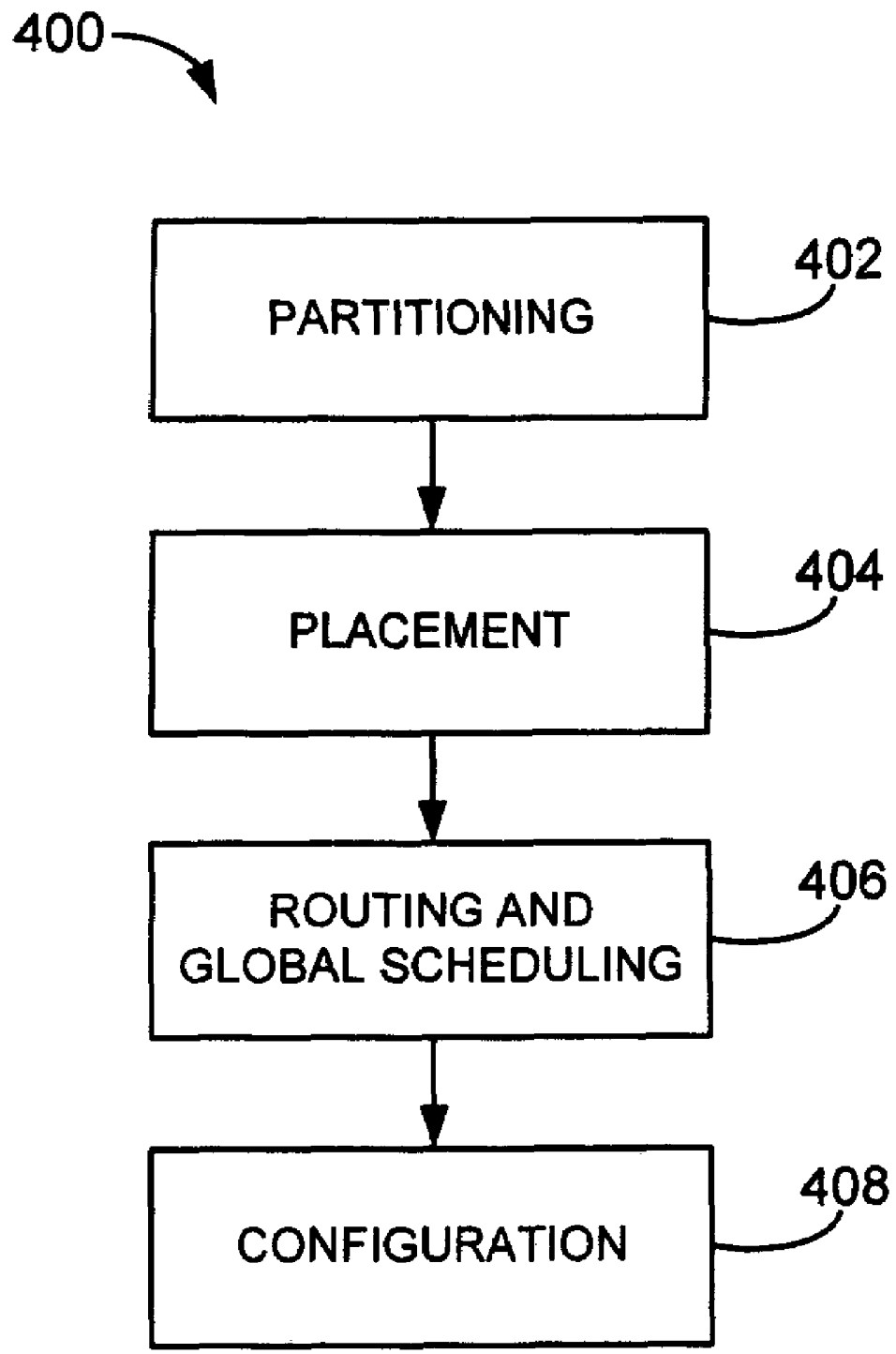
FIG. 4 is a flowchart for a compiling process.

Referring to FIG. 4, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program, as described in more detail below.

When the processor in the tile is able to exploit some amount of fine-grained ILP, for example, when the processor is a VLIW, multithreaded (CGMT, SMT, or FGMT), or superscalar processor, then the compiler has an additional challenge. In some cases the compiler schedules the available parallelism (e.g., ILP) across (1) several tiles, and (2) across the parallelism of afforded within a single tile (for example, over multiple functional units). When compiling instructions for an integrated circuit that includes tiles with VLIW processors, for example, the compiler is able to schedule the instructions in the VLIW processor within a tile at the same time that it is scheduling instructions across multiple tiles. The compiler is able to make a tradeoff as to where to schedule a given instruction—on the same tile using VLIW parallelism, or on another tile using inter-tile parallelism, for example. The compiler can do so, for example, by modifying the partitioning phase discussed previously. Instructions that are in the critical path of the program can be assigned to a single tile. Instructions that feed operand values directly into any of the instructions in the critical path, or instructions that consume operand values produced by critical path instructions, can be placed on the same tile to exploit VLIW parallelism. Instructions that are further away from the critical path instructions, or instructions on a different critical path can be placed on another tile. In general, code scheduled for a VLIW tiled architecture will result in fewer tiles being used than in an architecture that executes only one instruction in a given cycle.

3 Additional Features

3.1 Pipeline Integration

In general bypass paths in pipelines short circuit values from one pipeline stage to another without the need to transmit the values to the register file or to memory each time. The bypass paths in a processor are thus critical resources for shuttling values around between various stages such as ALUs, register files, load-store queues, writeback stages, and so on. As described above, a register mapped interface is able to integrate the switch 220 into the bypass paths of the processor pipeline 208. Register mapped interfaces allow the processor 200 to use register names to refer to buffers that couple data into or out of the static or dynamic networks. Values may be coupled from a processor bypass path to a switch output port, or values may be read from the switch into the processor bypass paths.

Integration of the switch 220 into the bypass paths of the pipeline 208 enables the values that are destined to the switch 220 from the processor 200 to be picked directly from the processor pipeline 208 as soon as they are produced. For example, data values from the pipeline 208 can be sent to switch buffers 232B directly from the processor's bypass paths, even before the values are written to the register file 236 (FIG. 2B) at a writeback stage.

If values going to the network are ordered, care should be taken when choosing which value to forward to the network in any given cycle. If "long-latency" instruction that requires the whole pipeline to compute writes to the network, and it is followed by a "short-latency" instruction that also writes to the network, but requires fewer pipeline stage to compute, then to preserve ordering of values to the network, the value from the short-latency instruction is delayed from reaching the network until the long-latency instruction has written to the network. Control logic is used to determine which value in the pipeline that targets the network is the oldest to preserve ordering of values going to the network. It is possible to use a reordering buffer or a unordered network to relax this strict ordering requirement.

The pipeline integrated switch enables a value computed by an ALU of a given tile to be used as an operand in a neighboring tile's ALU with extremely low latency, e.g., in 1 to 3 cycles, as opposed to 5 or 10 cycles, which might be the case if the value was picked from the pipeline in the writeback stage of the pipeline. This low latency transfer of single word operands between tiles is an important aspect of enabling an ILP (instruction level parallelism) compiler to compile programs written in sequential C, C++ or other high level languages to multiple tiles.

Register file size can be increased from the size used by other processors (which may have 8 to 32 registers), for example, to 64 or more registers, because some of the register name space is used up to name switch buffers.

In VLIW processors, multiple subinstructions in a macroinstruction may attempt to read or write to the switch buffers. If multiple subinstructions in a macroinstruction try to write to a register name mapped to the same switch buffer, there is a potential conflict. The compiler can avoid such conflicts in scheduling the VLIW instructions. Alternatively, the tile can serialize multiple writes into the switch buffers allowing the writes to take place sequentially without a conflict, as described in more detail below. Multiple instructions in a macroinstruction are able to read from the same switch buffer without a conflict.

When an outgoing value is coupled from the processor 200 to the switch 220, the processor instruction may include a switch register specifier denoting one of several output registers. The specified output register may be linked to a static coupled switch (with the OD mode indicator set to coupled mode), a static decoupled switch (with the OD mode indicator set to operand decoupling mode), or to a dynamic network switch.

For increased speed, the switch register specifier is able to directly specify a register of a neighboring processor. A direct name identifying the register can be included, or there can be a directional mode indicator in the instruction that allows the register name to be interpreted based on the name space of a neighboring tile. For example, a directional mode indicator can be 2 bits corresponding to a register in a tile in the east, west, north, or south direction. Directional mode indicators allow the name space of a register specifier to be inferred to be that of a neighboring tile. Particularly for a slow clocked system, it is useful to avoid a multi-hop near neighbor latency by using a directional mode indicator to enable a single-hop communication event from one tile to a neighboring tile.

Alternatively, instead of sending a processor value to a register on the same tile using a register specifier, or to a neighboring or other tile's register or ALU, a processor value can be sent to a memory using a memory specifier, or to an I/O port using an I/O specifier.

When an incoming value is coupled from the switch to the processor, the processor instruction may include a register specifier denoting one of several input registers from the switch. These input registers serve to synchronize the processor pipeline with the switch even if the switch is running in decoupled mode. There can be more input ports than just the 4 directions (north, south, east, and west). For example, there can be multiple networks, and there can also be communication paths forming "hyperlinks" that skip multiple tiles.

Another mode indicator called the Processor Switch Coupling (PSC) mode indicator indicates whether program counters of the processor 200 and switch 220 are to be coupled. If this PSC mode indicator is set, the processor and the switch program counters are coupled and the two are incremented synchronously. For example, both the processor and switch pipelines are stalled if either is stalled.

It is useful for some of these mode indicators, in particular, the directional mode indicators, to be linked to the clock speed of the integrated circuit 100. For example, a given mode may be more appropriate for a given clock speed. In some cases, a tile is allowed to transfer data over hyperlinks to non-neighbor processors (e.g., by allowing a compiler to have visibility of the hyperlinks) only when the clock speed is lower than a predetermined rate. This is because hyperlinks to tiles, which are normally two or more hops away in a two dimensional (east, west, south, north) mesh network, will traverse longer data paths. Data that traverses a longer data path will take longer to reach its destination. Therefore, in some cases, these longer delays limit the integrated circuit 100 to operating with slower clock speeds when hyperlinks are used than the clock speeds that may be available when hyperlinks are not used. In some implementations, the clock speed of the integrated circuit 100 is itself controlled by one or more mode indicators.

3.2 Direct Memory Access

The static and dynamic networks transport data among buffers in the switches. The buffers are used as first-in-first-out (FIFO) queues that are able to pour data into various sinks on the tile, or receive data from various sources on the tile. The processor 200 on a tile can be a source or sink of data to or from a buffer in the switch in the same tile or in a neighboring tile. For example, a buffer can be coupled to a register that the processor 200 can write to or read from. In some cases, a processor 200 may read a data word from the switch buffer and execute an instruction to store that data word in memory (e.g., either in a local cache in the tile, or in a memory external to the tiles 102 via the dynamic network).

In other cases, a larger amount of memory (e.g., multiple words) may need to be stored in memory. In some examples, each tile includes a DMA engine. Using a direct memory access (DMA) approach, a block of data including multiple words can be stored in memory without requiring the processor to execute an instruction to store each word of the data (or each segment of data greater than a cache line). The processor executes one or more instructions to set up the DMA transfer for outgoing DMA. For example, the processor writes a start address and an end address of the data block to be transferred into one or more registers. Alternatively, the processor writes a start address and the size of the data block into registers.

A DMA controller in the tile transfers the data in the background without processor intervention, enabling the processor to execute other instructions during the DMA transfer. At other times, such as during a cache miss, the size of data that is sent into the cache of a tile without processor intervention is limited to one cache line (e.g., around 16 to 128 bytes). The size of the data block transferred in a DMA transfer can be much larger than a cache line (e.g., 4 Kbytes). This DMA approach can be indicated by control information within the data (e.g., the data can contain a DMA tag that determines whether the data is destined for a register (to be handled by the processor 200), or for direct memory transfer. In the static network, the tag can be appended to the data. In the case of the dynamic network, since the data is in the form of a packet with a header, the tag can be included in the header.

If the DMA tag is set, the data arriving at the switch of a destination tile is deposited into a DMA queue and the data is passed directly into a cache or static memory without involving the processor 200. If the DMA tag is not set, the data is put into a FIFO coupled to the registers of the processor 200. The value of this twofold processing is that when the data is to go into memory, the processor does not have to be involved in the receipt of the data. The DMA tag is set by the sender of the data.

In an alternative implementation, the DMA tag is not contained in the data (or its header), rather there is a mode indicator called the DMA mode indicator in the appropriate network port (or in the tile). If this DMA mode indicator is set, then the data is directed to memory.

3.3 Multiple Processor Instruction Streams

There are a variety of ways in which a tile 102 is able to process multiple instruction streams. A tile 102 is able to process an instruction stream for the processor 200 and an instruction stream for the switch 220. In the operand decoupling mode described above, the switch 220 processes multiple instruction streams (e.g., derived from a macro instruction stream) using multiple program counters to switch data for multiple output ports independently. These separate processor and switch instruction streams provides a form of concurrency in which a tile can execute computations and switch data in the same clock cycle.

In another form of concurrency, some or all of the tiles can include a processor 200 that is configured to process multiple instruction streams. The multiple instruction streams can be derived from a common macro instruction stream such as in a VLIW processor, or can be provided as separate threads. The processor 200 can include multiple logic units that process a corresponding one of the instruction streams, based on a common program counter as in a VLIW processor, or based on separate program counters as in a multithreaded processor. The processor 200 can also include multiple register files each associated with a corresponding one of the instruction streams. These multiple processor instruction streams provide a form of concurrency in which a tile can execute multiple computations in same clock cycle.

The multiple logic units can include, for example, one or more of an arithmetic logic unit, an arithmetic unit, a multiply accumulate unit, a multiply add unit, a vector unit, a load or store unit, or a branch unit. The logic units can also include units that interact with the switch, such as a switch read unit, which reads data received by the switch, or a switch write unit, which stores data that is to be sent over the switch. For example, a switch write unit can include a FIFO buffer or a register.

Figure 5A:
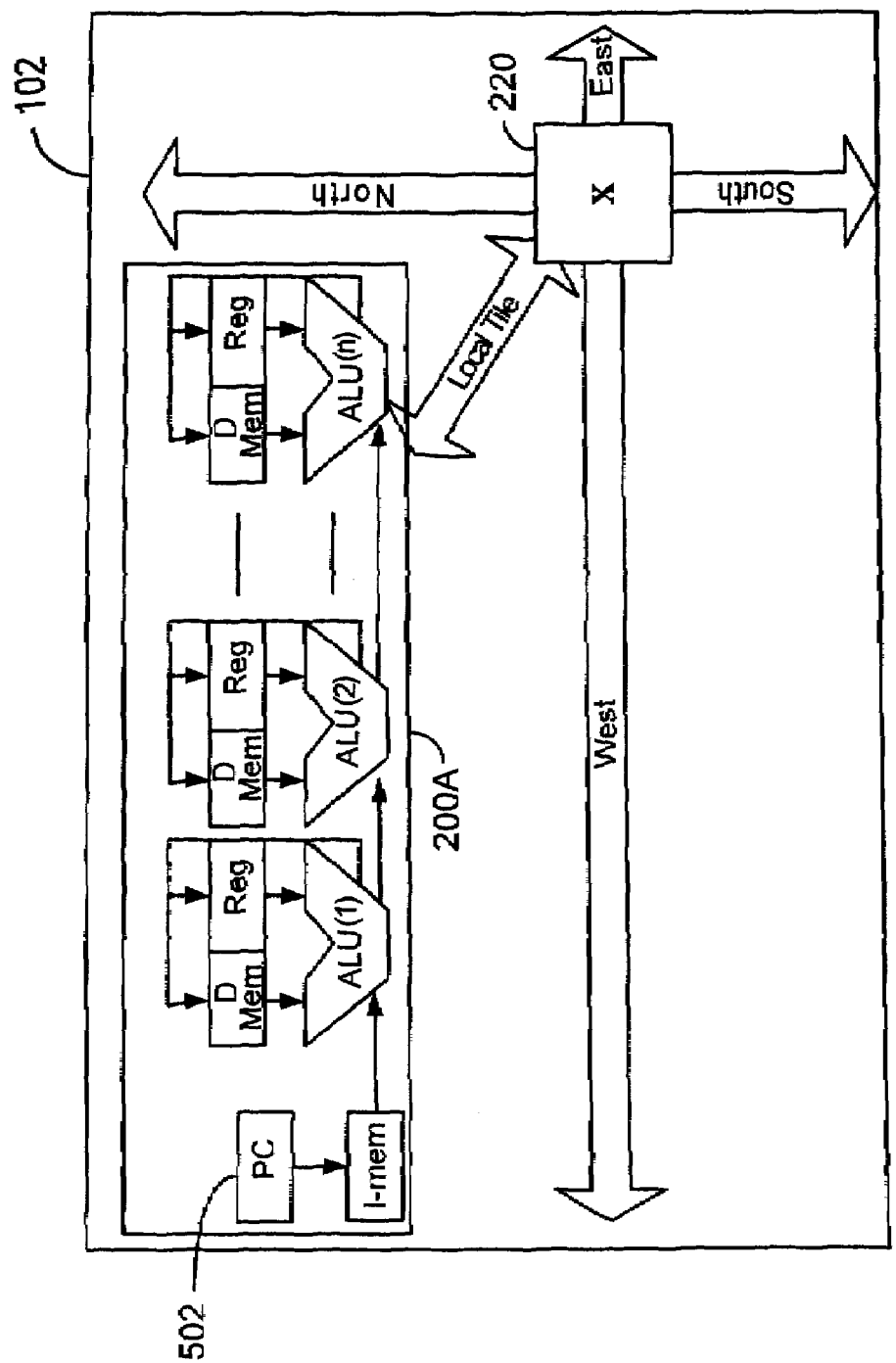
FIG. 5A is a block diagram of a VLIW processor.

In the case of a VLIW processor, the processor 200 is configured to execute instructions taking into account interactions with the switch 220. For example, the subinstructions of a VLIW instruction are executed together; therefore, if some subinstructions are reading from or writing to a port of the switch, the processor may need to stall execution of the VLIW instruction if a subinstruction is temporarily unable to read from or write to a port of the switch. FIG. 5A shows an example of a tile 102 including a VLIW processor 200A having n ALUs (ALU(1)-ALU(n)) that operate based on a common program counter 502.

Figure 5B:
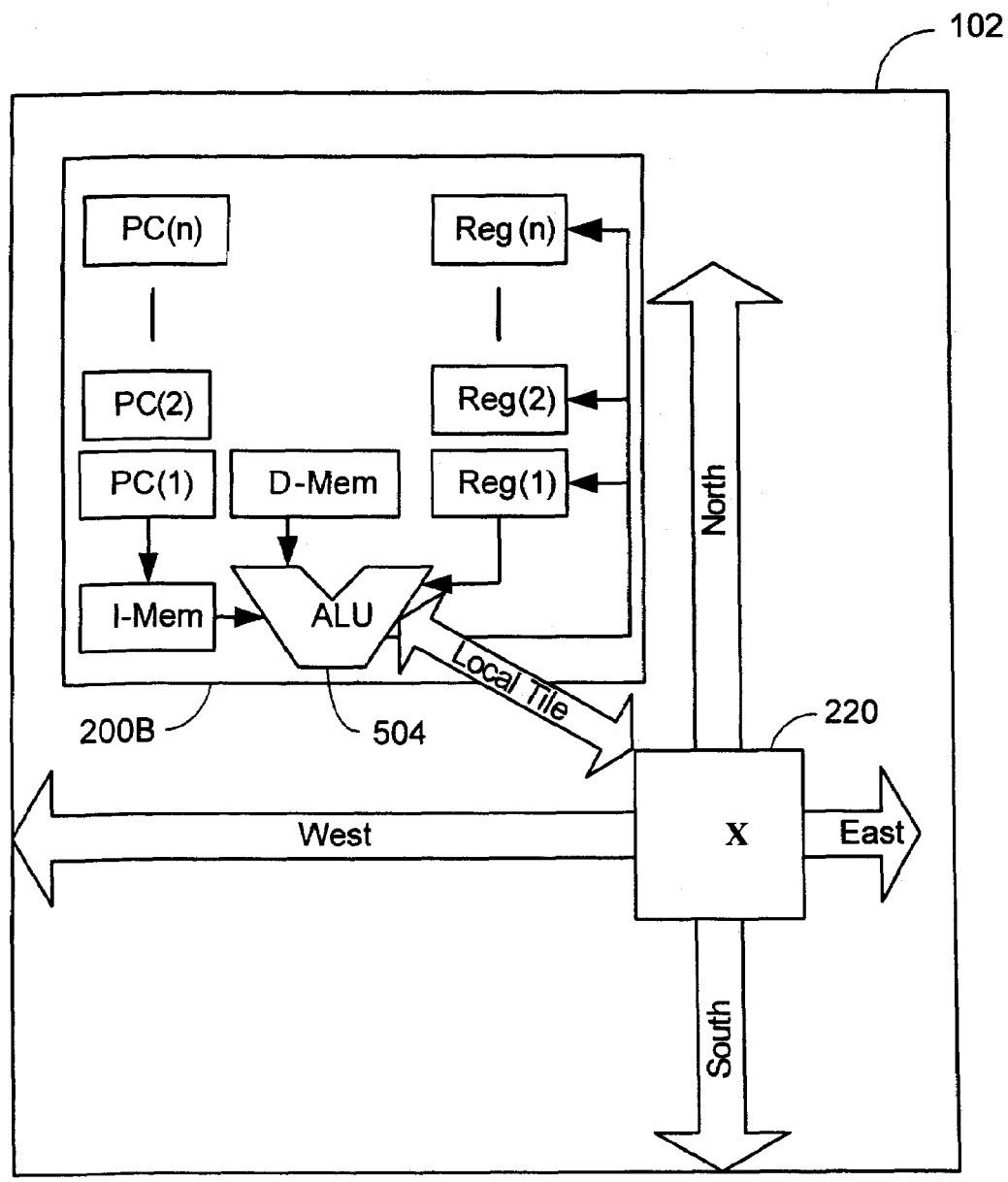
FIG. 5B is a block diagram of a multithreaded processor.

There can be a long latency associated with certain tasks such as accessing memory, sending data across the network, an synchronizing multiple tiles. When one thread of a multithreaded processor is executing an instruction involving one of these tasks, another thread can perform another task so that the latency associated with those tasks are overlapped. FIG. 5B shows an example of a tile 102 including a multithreaded processor 200B having n program counters (PC(1)-PC(n)) and n register files (Reg(1)-Reg(n)) that can be selectively coupled to an ALU 504 so that when one thread is waiting on a long latency event, the processor 200B switch to a new thread in a new context, characterized by a different program counter and register file.

Figure 5C:
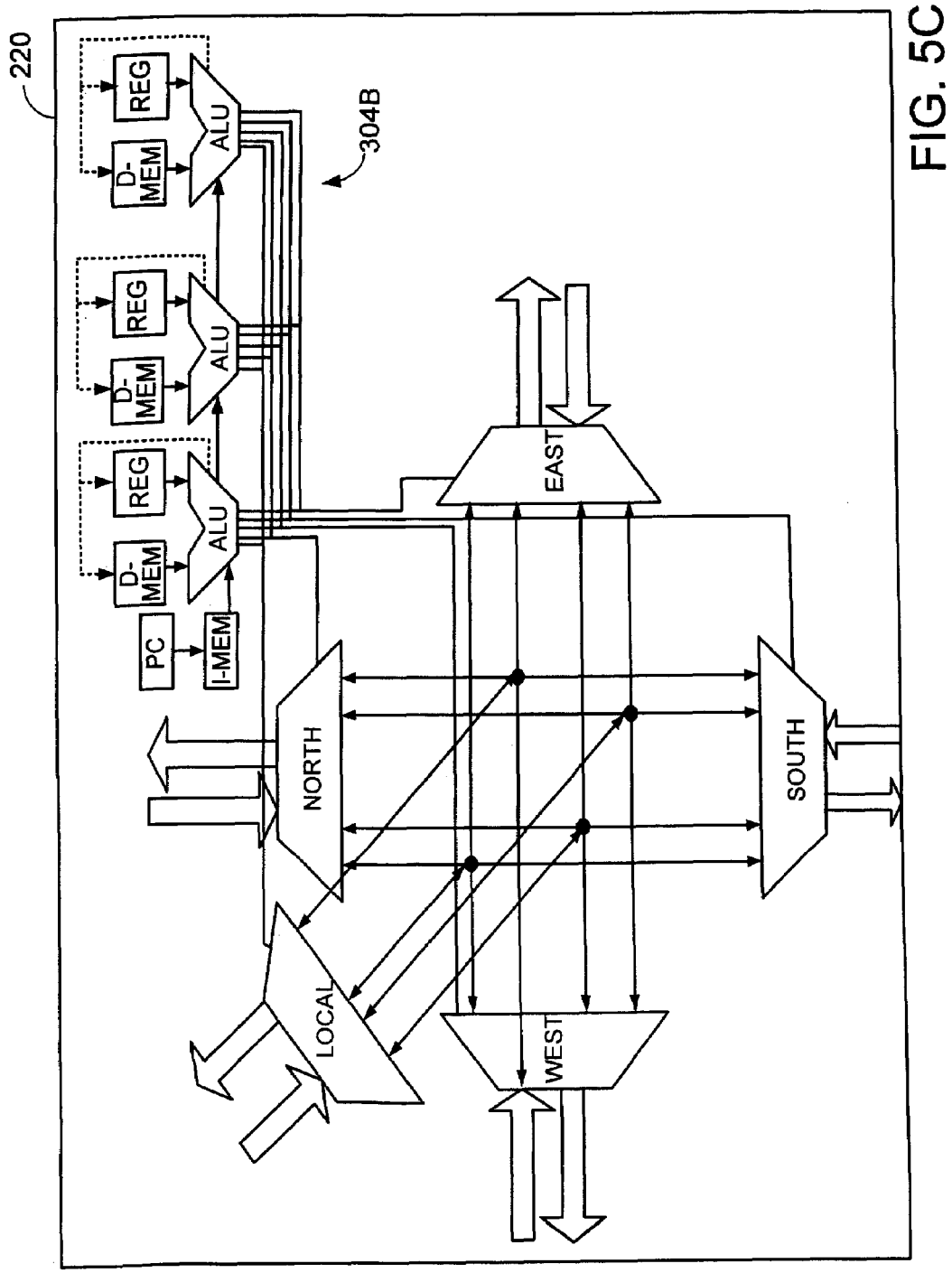
FIG. 5C is a block diagram of a VLIW switch processor.
Figure 5D:
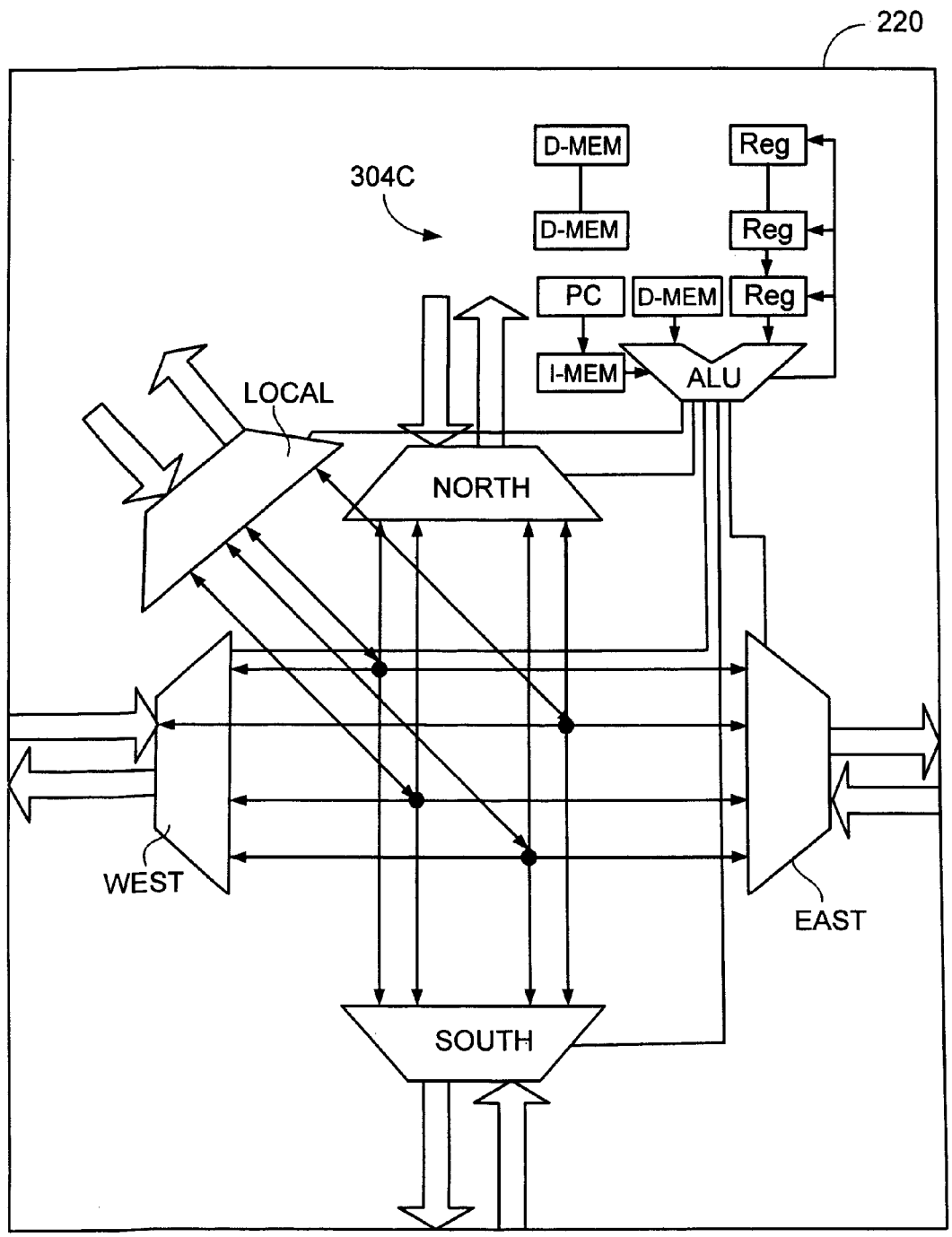
FIG. 5D is a block diagram of a multithreaded switch processor.

A switch processor can also be a VLIW processor 304B or a multithreaded processor 304C, as shown in FIGS. 5C and 5D, respectively.

When a compiler partitions a program into subprograms to execute in a tiled integrated circuit having VLIW or multithreaded processors in the tiles, the compiler generate parallel code for a maximum number of threads larger than the number of tiles in the integrated circuit 100 (e.g., up to four times the number of tiles if each tile has a VLIW processor with four subinstructions).

In the partitioning phase, the compiler partitions a program into sets of instructions that are able to be executed in parallel. For example, the compiler uses a graph to indicate which instructions can be executed in parallel. In the placement phase, the compiler maps the sets of instructions to tiles. The compiler determines in which tile each of the sets of instructions is to be executed is based in part on critical path information from the graph to determine which instructions to run in the same tile, and which to run in separate tiles. One or more of these sets of instructions selected to run within the same tile represent a subprogram for the tile.

Thus, a subprogram for a tile may include multiple sets of instructions that can be executed in parallel threads within the tile. For example, in a VLIW processor, for those sets of instructions selected to execute on the same tile, the compiler determines instructions within the sets of instructions that will run in parallel in the same VLIW macroinstruction. The compiler determines instructions for a macroinstruction based in part on information characterizing which functional units (e.g., ALUs) are available to be used in parallel to execute a macroinstruction.

4 Dynamic Networks

As described above, the switches 220 include dynamic network circuitry for routing packets of data based on a destination address in the header of the packet. The payload of a packet includes a message or a portion of a message that is delivered to the tile at the destination address. Packets can have a fixed length, or a variable length. In one approach to variable length packets, a packet can vary in length from one word plus a header word, up to 127 words plus a header word. The header word contains a field that determines the length of the packet.

The switch control module within a tile controlling the dynamic switch (e.g., a dynamic switch processor) performs functions for transmitting, routing, and receiving packets. In some cases, the control module in a receiving tile processes multiple packets to recover a message that is larger than the maximum packet size. For example, the control module in the transmitting tile segments the message among payloads of multiple packets. The control modules in the tiles along a route between the sending and receiving tiles route the segments in the order in which they are received. The control module in the receiving tile reassembles the message. This segmentation and reassembly can be controlled by a communication protocol in software running in a dynamic switch processor of a transmitting or receiving endpoint tile, or in software running in the tile's main processor 200. In other cases, the atomicity afforded to data by packetization enables data associated with an atomic transaction to be transmitted in the payload of a single packet to ensure that the data will not be interrupted by other packets.

The tiles can include circuitry for multiple independent dynamic networks. The different dynamic networks can each be dedicated to handling a particular type of traffic. For example, one dynamic network handles traffic associated with a user, called the User Dynamic Network (UDN). Another dynamic network handles traffic associated with the operating system and is primarily used to communicate with input and output devices, called the Input/Output Dynamic Network (IODN). Another dynamic network handles enables tiles and I/O devices to interface with copious memory (e.g., DRAM coupled to the network), called the Memory Dynamic Network (MDN).

In one approach to deadlock recovery, described in more detail below, the MDN is used in a specific manner to guarantee that deadlock does not occur on the MDN. The MDN is also used for inter-tile memory traffic (e.g., to a tile's data cache). Data can be coupled to the MDN by the processor 200 in the tiles, or by a DMA interface in the tiles. The DMA interface can be coupled to one or more of the other networks as well.

The control module handles routing data from a sender to a receiver. Routing includes processing a destination identifier to determine a route the data should traverse to the receiver. In some implementations, the dynamic networks have a two-dimensional topology and use dimension-ordered worm-hole routing. The dimension-ordered nature of the networks means that packets on the network follow a deterministic routing path, for example, first along the "x" dimension (e.g., East/West) and then along the "y" dimension (e.g., North/South) in a two-dimensional network.

Figure 6:
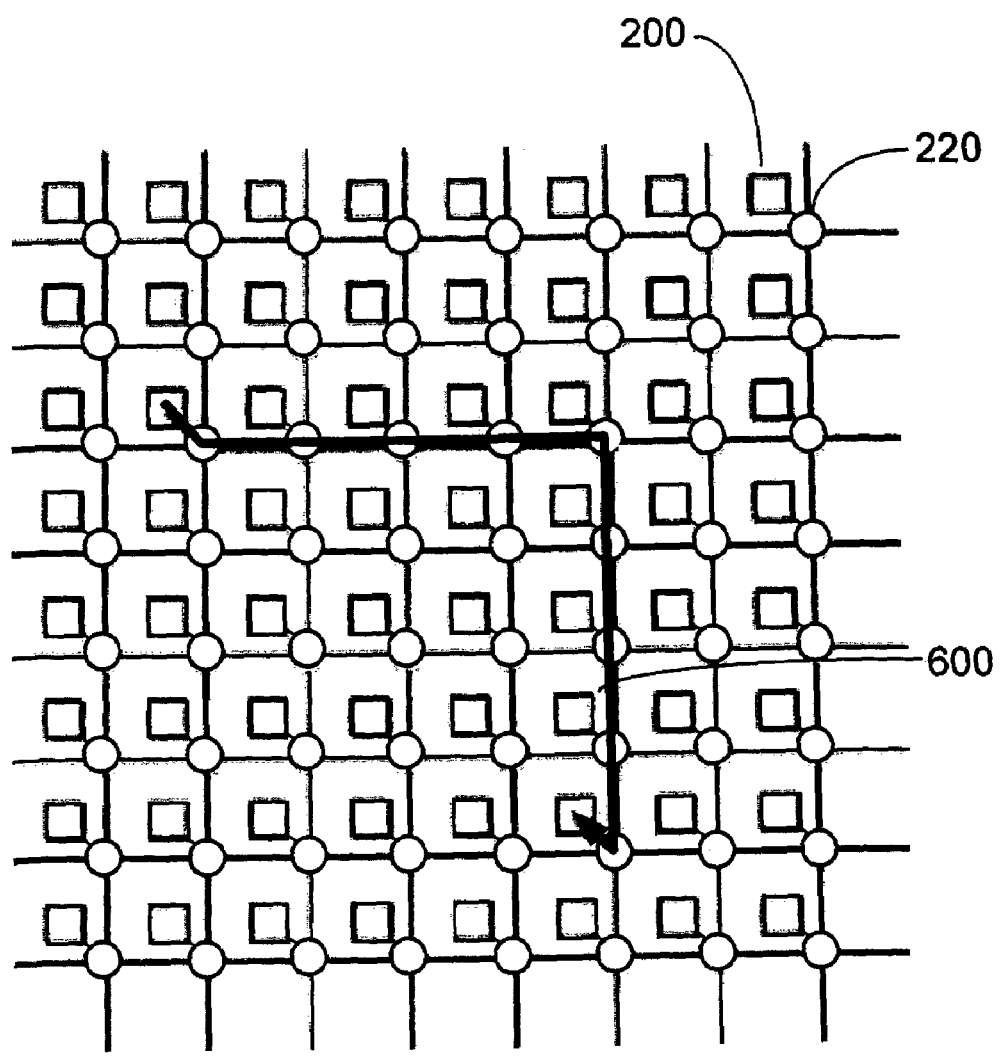
FIG. 6 is a block diagram of a route through an array of tiles.

FIG. 6 shows the path 600 taken by a packet sent from the tile at coordinates (1,2) to the tile at coordinates (5,6). As in the static network, each clock cycle one word of data traverses a link from one tile to a neighboring tile. The head word of the packet (e.g., the header) worms through the network and reserves links between the intermediary switches along the route. Subsequent words of the packet up to the tail word continue to worm through the network along the same path set up by the head word. The tail of a packet worms through the network and clears the path for use by other packets. As the tail traverses the network, it clears up a path for other packets to use reserved links. Wormhole networks are named as such because packets appear to worm through the network. One reason that wormhole networks are advantageous is that they reduce the amount of buffer space needed in the switches.

A packet reaches its destination tile when both the x and y coordinates match the coordinates of the destination tile (e.g., stored in a register loaded when the system boots). Alternatively, the packet header can contain the number of hops in the x dimension as a $\Delta x$ count and the number of hops in the y dimension as a $\Delta y$ count. In this scheme, the value of $\Delta x$ is decremented after each hop in the x dimension, and the value of $\Delta y$ is decremented after each hop in the y dimension, and the packet reaches its destination when $\Delta x$ and $\Delta y$ become 0.

After a packet reaches the destination tile, the packet is then sent to a final destination (which can also be indicated in the packet header). The final destination can direct data to an off-tile location over a network port to the north, east, south, west, or can direct the data to a functional unit within the tile, such as the processor or an on-tile memory unit or functional unit. This final destination routing enables data to be directed off of the network to an I/O device or memory interface, for example.

The final destination can be encoded in multiple bits, for example, indicating a direction in 2-dimensions (north, east, south, west) corresponding to a port that leads out of the tile array, or higher than 2-dimensions (e.g., up or down). The final destination can also be encoded in a single bit, for example, indicating a either default final destination on the tile (e.g., the processor), or a default destination off of the tile (a predetermined "external port" that leads off the edge of the tile array).

The final destination can also be indicated by a combination of information in the packet and information stored in the tile (or otherwise accessible to the tile's switch). For example, in the case in which the final destination information in the packet is a single bit, the final destination information stored in the tile can indicate one of multiple on-tile locations (the processor or a DMA engine), or one of multiple off-tile locations (one of the two external ports of a corner tile).

4.1 Local Link-Level Flow Control

Reliable data delivery is achieved in the dynamic network using flow control to ensure that data is not lost or dropped when being routed in the network. Local or "link-level" flow control ensures that data is lost or dropped over a link between two tiles (e.g., due to limited buffering at a switch). Global or "end-to-end" flow control is used to further control the rate of data delivery between a sending tile (the "sender") and a receiving tile (the "receiver"), and is described in more detail below. Link-level flow control is not in general sufficient to provide end-to-end flow control due to the possibility of deadlock, (in this case, for example, due to limited buffering at a receiving tile at the end of a route) also described in more detail below.

One aspect of flow control includes managing the dynamic switch input buffers. Backward pressure is used to prevent a sending switch from sending further data if the input buffer at the receiving switch is full. This type of flow control is also called "backward flow control."

A first approach to implementing link-level flow control includes a signal sent from the receiver to the sender (e.g., over a dedicated wire) indicating that a particular input buffer is full, and that the sender should not send more data over the link. This "full signal" should be generated and sent to the sender quickly to reduce the delay in the critical path of link-level flow control.

A second approach to implementing link-level flow control is a credit-based approach. In this approach, the sender does not need to receive a signal from the receiver that buffer space is available (the buffer is not full) each time data is sent. In the credit-based approach, each sender maintains a count of the remaining space in the receiver's input buffer. As data is sent over a link, the sender decrements the count. When the count reaches zero, there is no more space in the input buffer and the sender is barred from sending data over the link. As data is read out of the input buffer, the receiver sends credits to the sender. The sender increments the count for each credit received.

In the credit-based approach, dynamic switch circuitry can be pipelined and can maintain full speed switch throughput. The size of the input buffer and associated credit counter are selected appropriately to account for the latency needed to send a credit from the receiver to the sender and to determine whether to send any further credits.

Figure 7:
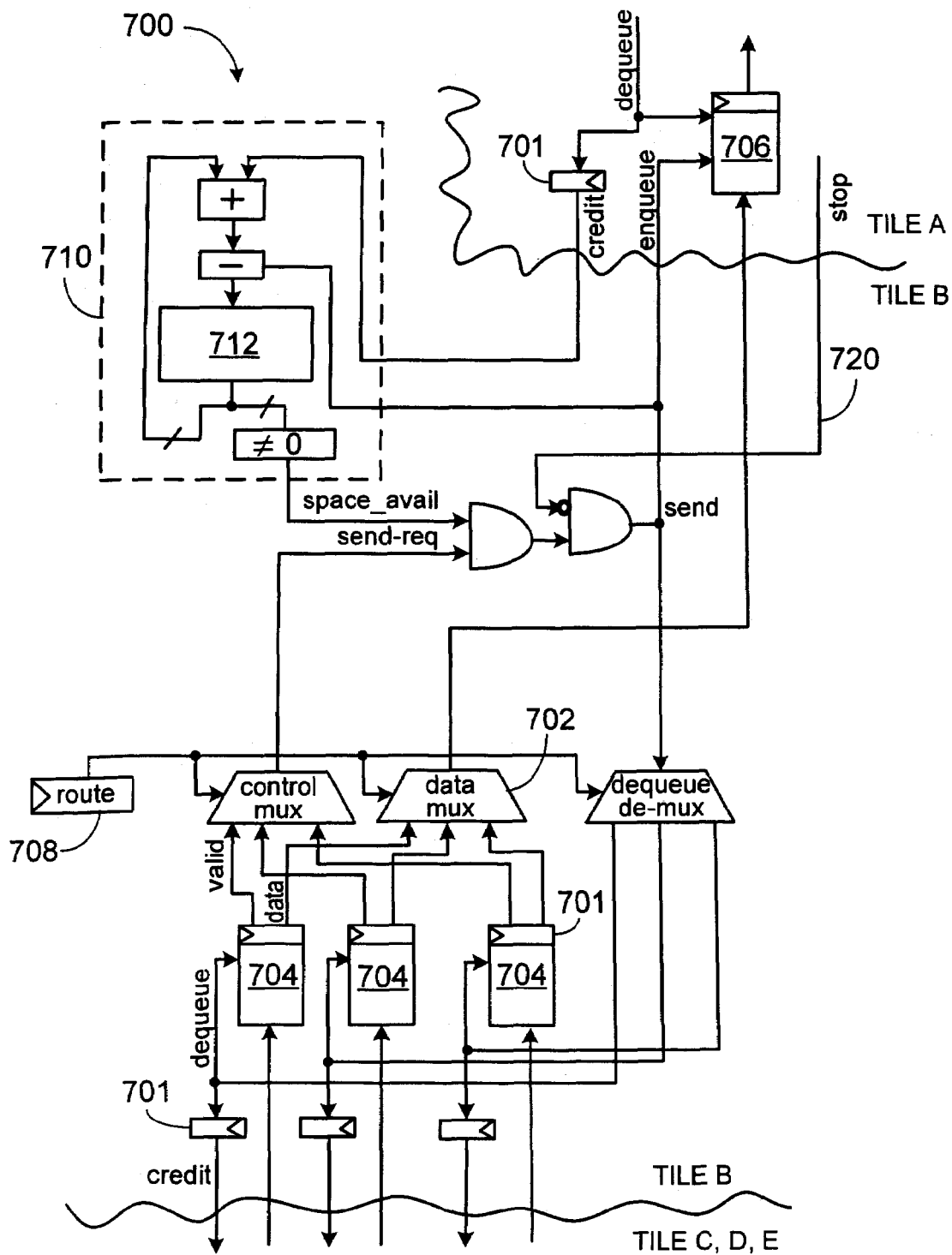
FIG. 7 is a block diagram of switching circuitry.

Referring to FIG. 7, switching circuitry 700 for a credit-based approach switches data among input buffers that each store up to 3 words of data corresponding to the arrangement of pipeline registers 701. The switching circuitry 700 is a portion of the dynamic switch that controls the flow of data from a sender tile_b to a receiver tile_a. The sender tile_b includes a data multiplexer 702 that selects a data word from input buffers 704 to send to the input buffer 706 of the receiver tile_a, according to route information stored in a route register 708. The route information is generated based on the headers of incoming packets. The sender tile_b includes an input buffer for each of the tiles to which it is connected (tile_a, tile_c, tile_d, tile_e, . . . ). However, since the switching circuitry 700 controls the flow of data to tile_b, the data multiplexer 702 does not necessarily need to be able to pull data from tile_b. Corresponding circuitry is used to control the flow of data from the sender tile_b to other tiles to which tile_b is connected.

Control circuitry 710 counts credits in a credit counter 712 corresponding to input buffer space available in the receiver tile_a. If there is at least one credit and an input buffer has data to be sent, the control circuitry 710 will assert a signal to dequeue data from the appropriate one of the input buffers 704 and enqueue the data to the input buffer 706. Otherwise the control circuitry 710 will stall, not sending any data to the receiver tile_a.

The credit counter 712 tracks available storage space in the input buffer 706 to ensure that the input buffer 706 will not overflow. However, the number of credits stored in the credit counter does not necessarily correspond to the actual amount of available buffer space in the input buffer 706 at that time since the control circuitry accounts for data that may flow into the input buffer 706 from pipeline registers.

The switching circuitry 700 also includes a mechanism to facilitate context switching in a tile. When one tile is entering a state in which no data should be received (e.g., performing a context switch, or entering a low-power mode), that tile is able to signal each neighboring tile to stop sending data using a "stop signal" transmitted over a wire between the tiles. For example, tile_a can assert a stop signal line 720 to override any remaining credits that would otherwise enable tile_b to keep sending data.

4.2 Register Mapped Network Communication

As described above, in some examples the dynamic networks are able to transfer data to and from the main processor through a register mapped interface. When the main processor reads a register corresponding to a particular network, the data is dequeued from the respective network input buffer. Likewise, when a register associated with a particular network is written by the processor, the data is directly sent out of a corresponding network output port.

The register mapped networks are both read and write flow controlled. For instance, if the processor attempts to read from a register connected to a network and the data has not arrived yet, the processor will stall in anticipation of the data arriving. Outbound data communication can also receive backward pressure from the networks to prevent it from injecting into the network if the network buffer space is full. In this case, the processor stalls when the outbound buffer space is full for a particular network.

For efficient register mapped communication, the dynamic networks are integrated closely into the processor's pipeline. In effect, they contribute to the scoreboarding in the processor, and the processor maintains correct output ordering across variable length pipelines. One possible implementation of this register mapped communication is via integration of the input or output buffers into the bypass network of the processor pipeline. By doing so, for example, a value going out from the ALU in a pipeline can go to the switch on an immediately following cycle, and well before the pipeline writeback stage (which is the "pipeline commit stage" in some pipelines) when the data value is written into the register file. In the case of the tiled integrated circuit in which pipelines are coupled via a switch network, the pipeline commit stage is the earlier stage (generally earlier than the writeback stage) in which a value can be injected into the network. This is called an early commit pipeline. Also, in order to reduce latency, it is desirable to expeditiously forward a value to the network as soon as the value is computed. In order to accomplish this, an implementation may contain a forwarding network which chooses the oldest completed information in the pipeline to forward out to the network.

5 Tile Architecture

Figure 8:
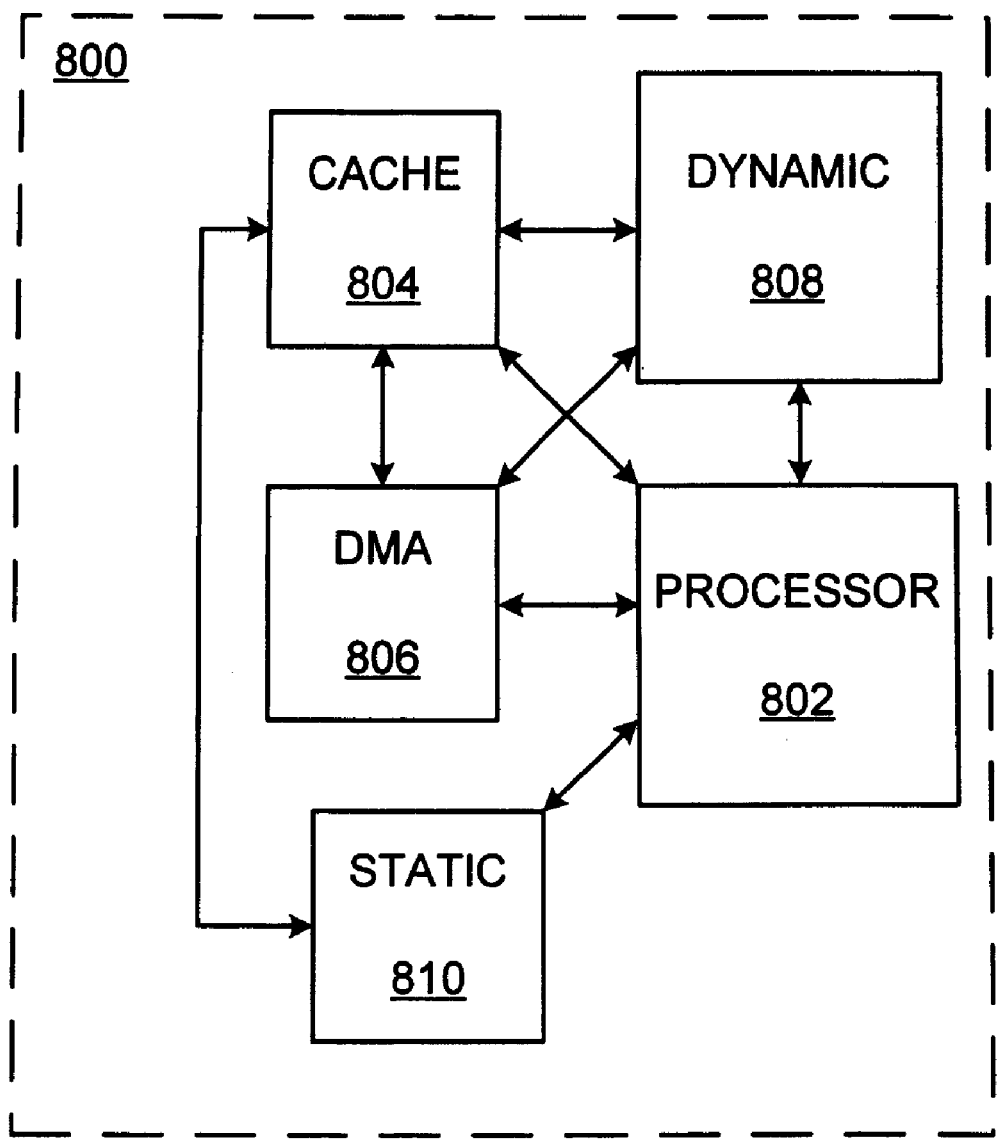
FIG. 8 is a block diagram of integrated circuit modules.

FIG. 8 is block diagram showing the relationships among the functional modules in an example of a tile architecture for an implementation of the integrated circuit 100. The tile 800 includes a main processor 802 that provides the main computational resource inside the tile. The tile 800 includes a cache module 804 that includes memory that can be configured as a cache managed by a cache state machine inside the module 804. The tile 800 includes a DMA engine 806 to manage access to external memory, enabling the main processor 802 to perform other tasks.

The main processor 802 communicates over the dynamic network through a dynamic network switch module 808, and over the static network through a static network switch module 810. The main processor 802 sends data to and receives data from the switch modules to communicate with other tiles and I/O devices via the inter-tile data paths. The switch modules include switching circuitry to forward data received over data paths from other tiles to destinations within a tile and to switches of other tiles, and to forward data received from sources within a tile to switches of other tiles.

The dynamic network switch module 808 manages access to multiple independent dynamic networks, including, for example, the memory dynamic network (MDN) and the I/O dynamic network (IODN). The module 808 includes a "switch point" for each of the dynamic networks accessed by a tile.

Figure 9A:
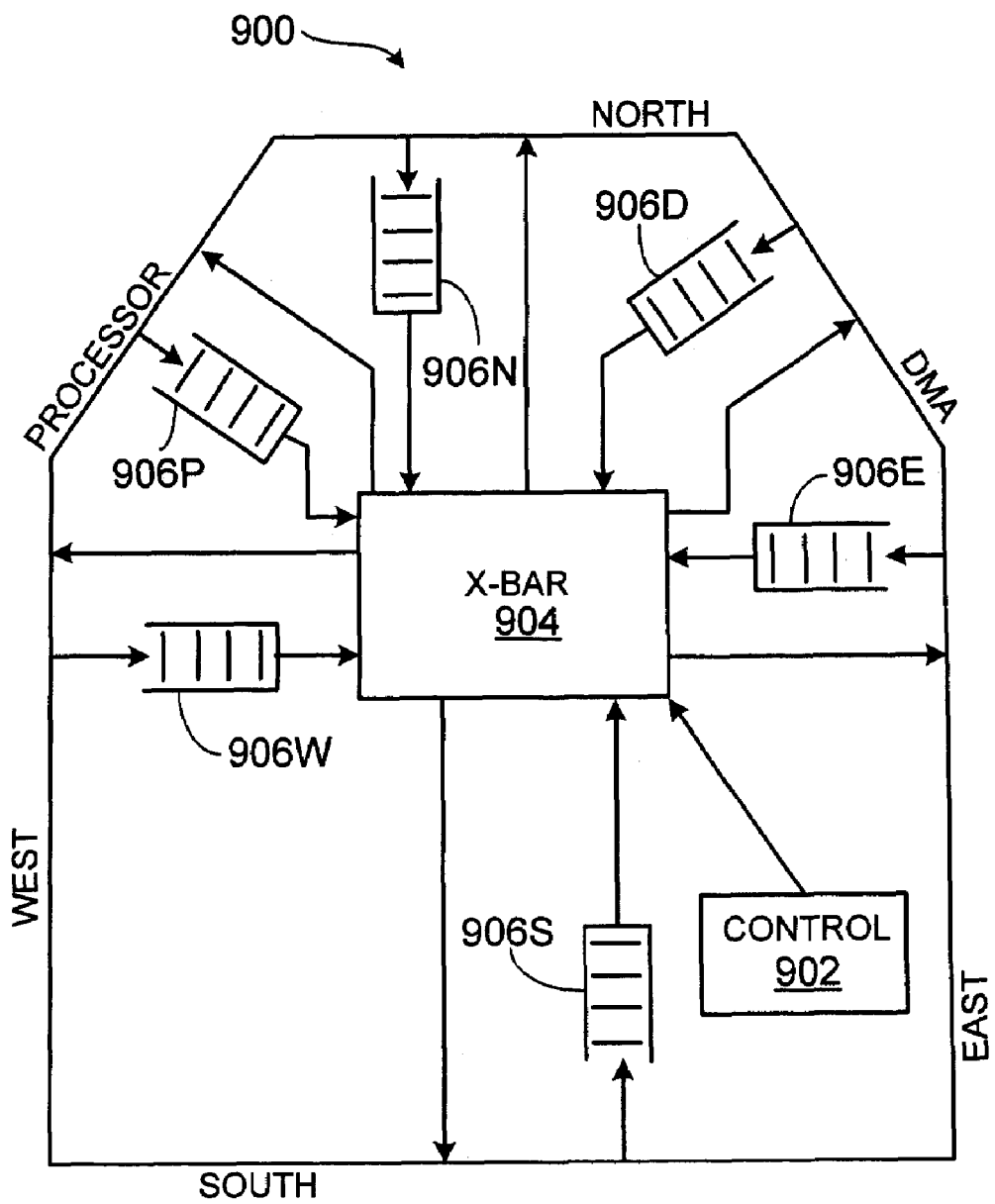
FIG. 9A is a block diagram of dynamic network switching circuitry.

FIG. 9A is a block diagram showing switching circuitry for one of the switch points within the dynamic network switch module 808. A control module 902 configures a full crossbar fabric 904 to enable efficient non-blocking communication through the switch point 900. The switch point 900 is connected over a pair of input and output ports to neighboring tiles to the north, south, east, west, and includes an input buffer 906N, 906S, 906E, 906W for each input port. A dynamic network switch point also includes input and output port connections to a functional unit within the tile. For example, the MDN switch point includes input and output ports connecting to the DMA engine 806, and the IODN switch point includes input and output ports connecting to the main processor 802. In some cases, a switch point can include connections to multiple functional units, such as the switch point 900 shown in FIG. 9A which includes input buffers 906D and 906P to accept data from the DMA engine 806 and the main processor 802 to be sent over a dynamic network. Thus, one or more switch points within the dynamic network switch module 808 enable the main processor 802, the DMA engine 806, and the cache module 804 to access a dynamic network.

Figure 9B:
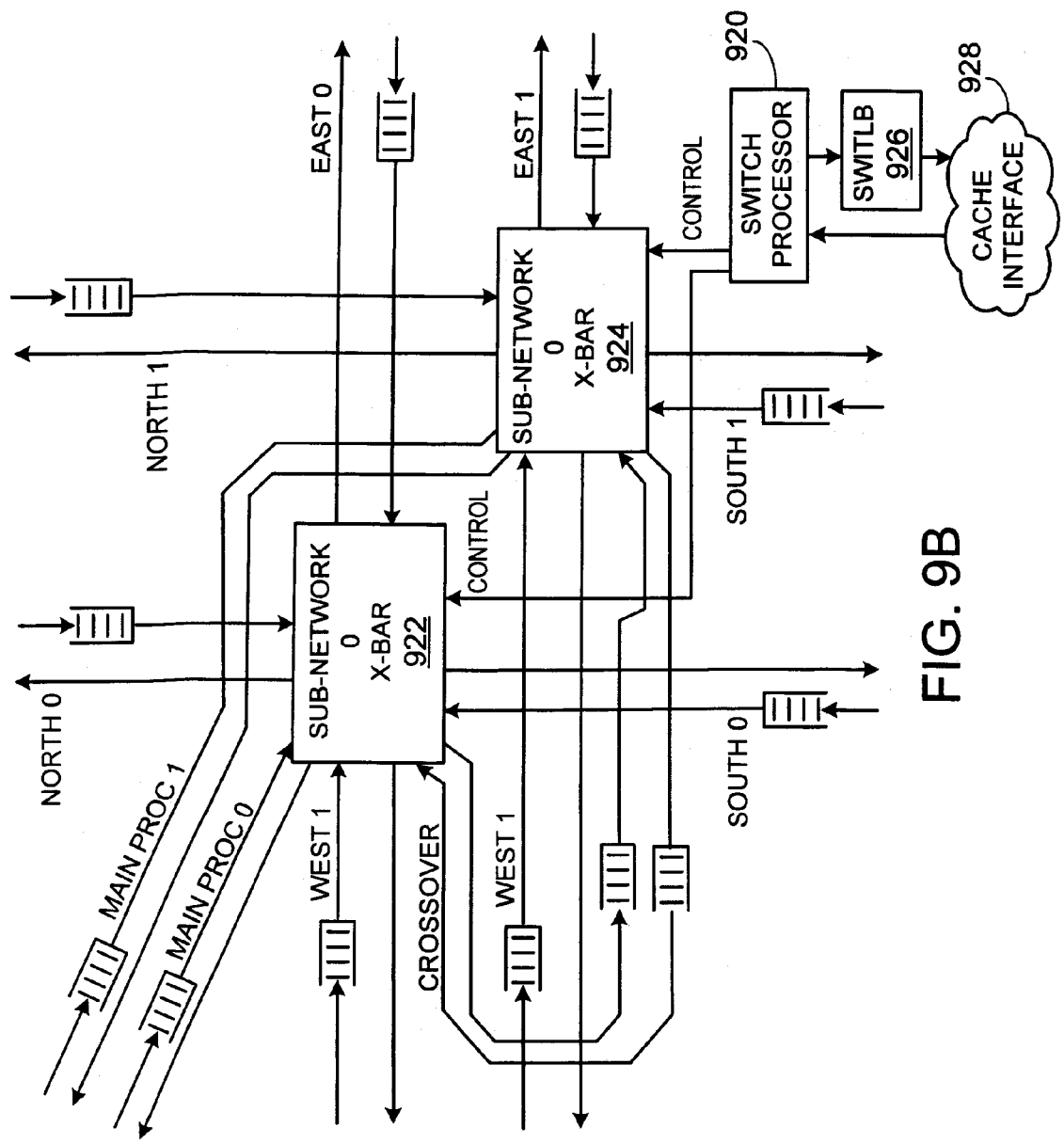
FIG. 9B is a block diagram of static network switching circuitry.

FIG. 9B is a block diagram showing switching circuitry that includes two static network switch points within the static network switch module 810. Each switch point controls a different static "sub-network." A crossbar fabric 922 for the first switch point and a crossbar fabric 924 for the second switch point are controlled by respective switch instructions processed in a switch processor 920. The switch processor 920 executes an instruction for each sub-network that determines how to route data values between different static sub-network ports, and between the static sub-network ports and the main processor 802.

The switch processor 920 contains a four entry 32-bit register file. This register file can be used for temporary storage and as a location to store a link or return value on function call boundaries. The switch processor 920 is able to execute the same branches as main processor 802. This enables the switch processor 920 to easily mirror the control flow of the main processor 920. The switch processor 920 includes a switch instruction buffer (SWIBUF) which maintains a small number of switch instructions to be executed. The SWIBUF communicates with the cache module 804 to receive switch instructions from a switch instruction cache. The SWIBUF provides virtual addresses to a switch instruction translation lookaside buffer (SWITLB) 926, which maps the virtual addresses to physical addresses provided to the cache module 804 over a cache interface 928.

Alternatively, the SWIBUF can be configured as a cache. The switch processor provides a virtual address to a switch TLB, which produces the physical address provided to the SWIBUF.

The switch processor 920 executes a VLIW type instruction that includes subinstructions that indicate "moves" of data from a specified input port to a specified output port. The switch processor 920 is capable of executing one branch or register file move operation and numerous moves across both of the crossbar fabrics 922 and 924 in a single clock cycle. The static network switch module 810 can be configured to operate in a synchronous mode that guarantees that all of the inputs that are needed by a particular instruction arrive before any of the subinstructions are executed, and an asynchronous mode that executes moves corresponding to different subinstructions as soon as the operands are available.

The cache module 804 is connected to each of the network switch modules 808 and 810, the DMA engine 806, and the main processor 802. The cache module 804 uses the MDN to communicate with external memory modules that provide a copious memory backing store. To communicate with the copious memory backing store, a cache state machine within the cache module 804 sends messages including read and write requests over the MDN directed to a memory controller for a specified external memory module. The copious memory backing store can be scaled by adding more memory modules and memory controllers to ports of the tile array. A physical memory mapping process, described in more detail below, is used to map the physical address memory range to memory ranges within the external memory modules.

The memory within the cache module 804 can be, for example, a unified static random access memory. The memory can be configured to provide a local cache for various types of data including an instruction cache for the main processor's instruction buffer (IBUF), a data cache for the main processor 802, an instruction cache for the switch processor's instruction buffer (SWIBUF), and a data cache for the DMA engine 806.

The cache module 804 can include multiple memories configured as multiple levels in a multi-level cache (e.g., a small L1 cache and a larger L2 cache). In some implementations, the multi-level cache can be configured to use a write-through policy to update multiple levels when the processor writes data into the multi-level cache. A write-through policy enables the DMA engine 806 to transfer data from the cache module 804 without needing to access multiple levels of the cache hierarchy. For example, the DMA, engine 806 can transfer data from the highest level cache.

To facilitate memory management of user level processes, a cache can support multiple logical sets of data. For example, TLB entries can be used to enable the on-tile cache to support a "red" set of data and a "black" set of data. By using distinct sets of cache entries for replacement and a set associative cache, regions of memory can be effectively locked down in the cache. This type of red-black cache is described in more detail below.

The main processor 802 can configure the cache module 804 to control the manner in which the cache module 804 operates. The main processor 802 includes a load and store pipeline, described below, that communicates with the cache module 804. The main processor 802 and the static switch processor 920 are able to fetch instructions stored in external memory by communicating with the cache module 804. The DMA engine 806 performs load and store operations to transfer data between the on-tile cache managed by the cache module 804 and external memory or caches of other tiles.

Figure 10:
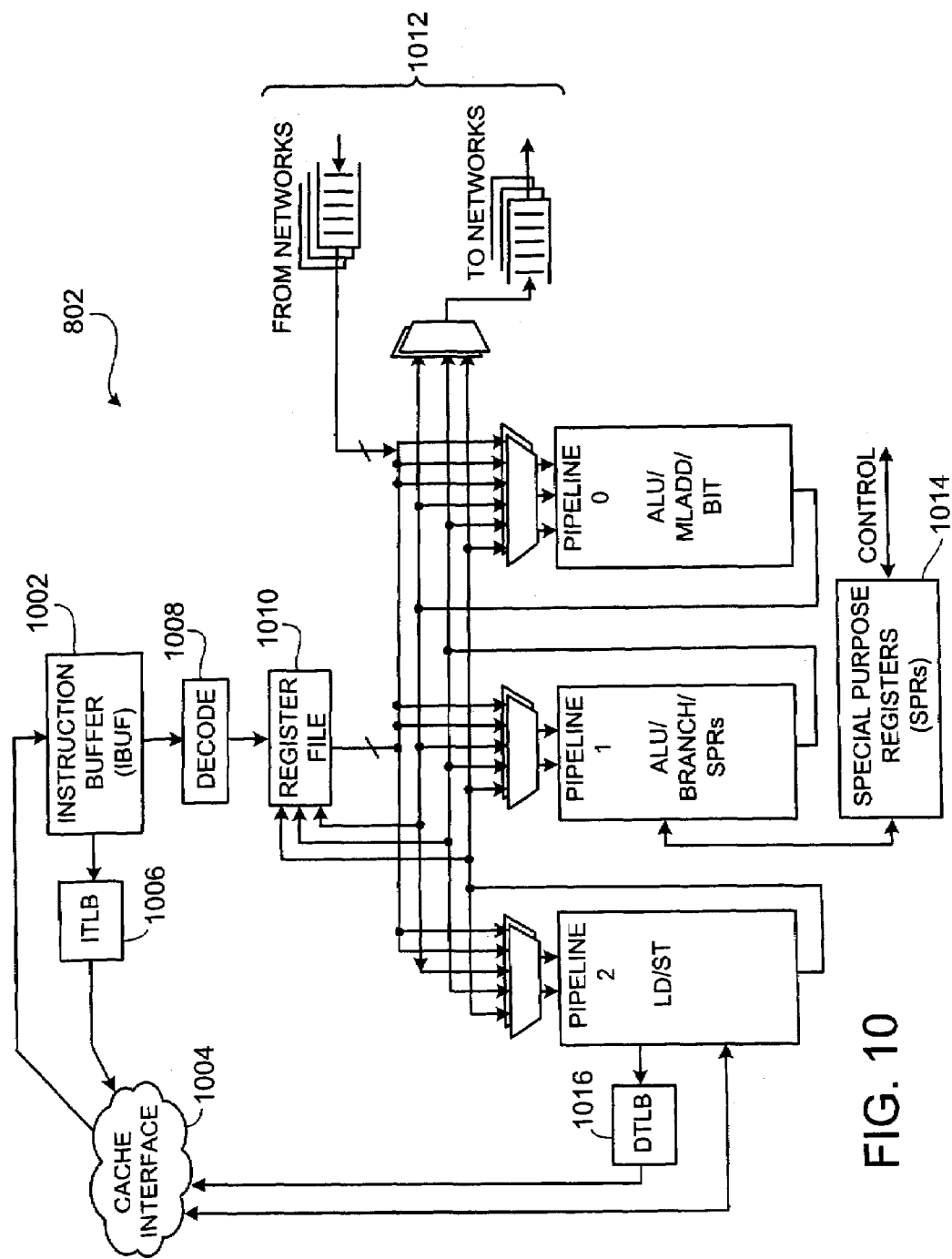
FIG. 10 is a block diagram of a main processor.

FIG. 10 shows an exemplary main processor 802 architecture. In this implementation, the main processor 802 is a 3-way very long instruction word (VLIW) processor. The size of an instruction (or "macroinstruction") is in this implementation is 128 bits (other implementations can use other sizes such as 96, 64, or 32 bits). The instruction includes 3 subinstructions respectively processed in three pipelines, "pipeline 0," "pipeline 1," and "pipeline 2." Each subinstruction is encoded in a portion of the instruction (not necessarily the same length), and are able to be independently decoded. In this implementation, 32 bits of the 128-bit instruction are reserved (e.g., for future use) and not used by the three pipelines. Pipeline 0 is capable of executing ALU operations, bit manipulation operations, select operations, and fused multiply-add operations. Pipeline 1 is capable of executing ALU operations, special purpose register (SPR) read and write operations, and control flow operations (e.g., branches and jumps). Pipeline 2 is capable of executing load and store subinstructions, and cache and memory maintenance subinstructions. In other implementations, the pipelines can be configured to execute other types of operations. For example, pipeline 0 can be configured to perform a multiply-accumulate operation instead of, or in addition to, the multiply-add operation.

Due to the fused multiply-add operation, the main processor 802 is capable of issuing four operations each clock cycle. For example, the main processor can perform one memory operation on pipeline 2, one operation on pipeline 1, and two operations (one multiply and one add) if pipeline 0 is executing a fused multiply-add (or "muladd") operation. If pipeline 0 is not executing a muladd operation, then the peak issue rate is three operations per cycle, of which one is an memory operation and two can be ALU operations, for example.

The main processor 802 includes an instruction buffer 1002 configured to fetch instructions through a cache interface 1004 to the cache module 804. An instruction translation lookaside buffer (ITLB) 1006 coupled to the instruction buffer 1002 translates an address of the instruction to be fetched to a physical address sent to the cache interface 1004. The cache interface 1004 returns one or more instructions to the instruction buffer 1002. For example, the cache module 804 retrieves a block of next instructions to be processed in the main processor 802. A decoder 1008 decodes the subinstructions from the instructions that have been fetched and stored in the instruction buffer 1002.

Alternatively, the ITLB 1006 can be located between the main processor 802 and the instruction buffer 1002. In this implementation, The instruction address generated by the main processor 802 is translated by the ITLB 1006 and then the instruction buffer 1002 is accessed according to the translated address. To speed up the instruction retrieval, the ITLB 1006 can be fronted by a smaller "micro ITLB" accessed before the ITLB 1006. If there is a hit in the micro ITLB, then the instruction retrieval proceeds using the resulting translation. If there is a miss in the micro ITLB, then the ITLB is accessed to provide a translation.

After decoding, the decoder 1008 determines which operands should be provided to each of the pipelines from a register file 1010. Because of the potential number of operands to be provided to the pipelines, up to seven reads from the register file 1010 may be needed. The register file 1010 is, for example, a 64 entry register file. Within the 64 entry operand name space, several of the registers are reserved for directly reading from and writing to buffers 1012 for the static and dynamic networks.

The operands from the register file 1010 or network buffers 1012 are fed to their respective pipeline. In addition to executing ALU operations, pipeline 1 handles instructions that can potentially affect the control flow of the main processor 1002, including branch or jump instructions. Control flow can also be affected by an exception or other form of processor interrupt, which can be initiated from numerous sources inside or outside the tile. Pipeline 1 also handles SPR read and write instructions to read and write into a special purpose register (SPR) set 1014. The SPR set 1014 enables the main processor 802 to configure and control the tile's operating characteristics such as TLB maintenance, protection maintenance, statistics gathering, and network interface characteristics.

Pipeline 2 provides access to external memory through the cache interface 1004. The load and store operations executed by pipeline 2 typically use 32-bit virtual addresses which are translated via a data translation lookaside buffer (DTLB) 1016 into 64-bit physical addresses sent to the cache interface 1004. There is also a mode of operation that can be used by the operating system and TLB refill handler that is able to bypass the translation of the DTLB.

The pipelines complete execution and write-back their results to the register file 1010. Subinstructions can also target the networks directly to send results out over a network. For example, a subinstruction can target both a register storage location in the register file 1010 and a static network port within the same instruction. The main processor 802 uses procedures to manage these joint write operations to the register file and to the network to ensure correct program order.

One aspect of managing the write operations includes maintaining rules relating to dependencies among the registers. For example, within a VLIW instruction, the subinstructions obey the following rules:

1. read-after-write (RAW) register dependencies are not allowed.
2. write-after-write (WAW) register dependencies are not allowed.
3. write-after-read (WAR) register dependencies are allowed.

If a VLIW instruction contains subinstructions that both read and write the same register(s), the reads will occur before the writes.

The execution of VLIW instructions is atomic, such that all subinstructions are executed or none of them are executed. Between instructions, each subinstruction corresponds to a state in which its read operation (if any) occurred after the update of all the subinstructions from the previous instruction.

Maintaining correct program order includes maintaining read-after-write, write-after-write and write-after-read dependencies among subinstructions. To improve performance, communication with the networks can occur at the earliest convenience that preserves ordering. To allow for this, data can be forwarded to the network before reaching the write-back stage of a pipeline. As described above, the networks are coupled directly into the bypassing logic of the pipeline to reduce latency when communicating with the network.

Since multiple functional units can produce results from different subinstructions in a single execution cycle, the main processor 802 is configured to handle the case in which multiple results target the same network port in the same cycle. In some implementations, the pipelines are configured to allow only one of the subinstructions to target a network port so that this case does not occur. For example, the compiler can enforce this constraint when it is generating the subinstructions. If a user produces assembly code and violates this constraint, then the assembler or software compile tool chain can issue an error during compilation. Alternatively, the main processor 802 can issue an error signal if it executes an instruction in which multiple subinstructions are targeting a network port.

In other implementations, there is a predetermined order in which the multiple results are sent into the commonly targeted network port. For example, the order of result injection into the network port can follow the order in which the subinstructions appear in the VLIW instruction. If the main processor 802 executes multiple instruction streams but is not a VLIW processor (e.g., if it is a superscalar processor), then a different predetermined order, such as an instruction order based on the original code, can dictate the order in which results are injected into the network.

In a superscalar processor, a hardware module such as an instruction picker can pick the maximum number of instructions or the order of instructions that will write into the network. Thus, whether the multiple instruction streams are determined in software in the compiler or in hardware in the instruction picker, the register-mapped network ports can be handled differently than regular registers.

The main processor 802 includes coupling circuitry to enable multiple subinstructions to read from multiple network input ports in the same cycle. In some implementations, the coupling circuitry is a fully connected crossbar fabric that allows any of the pipelines to read values from any of the network ports in the same cycle. In one example, each of three functional units for respective pipelines can accept two inputs. In any given cycle, a network port can be destined to any of 6 possible inputs points in a pipeline. If there are 4 network ports, the crossbar fabric would be large enough to direct any value from any of the 4 network ports to any of the 6 input points.

Figure 11:
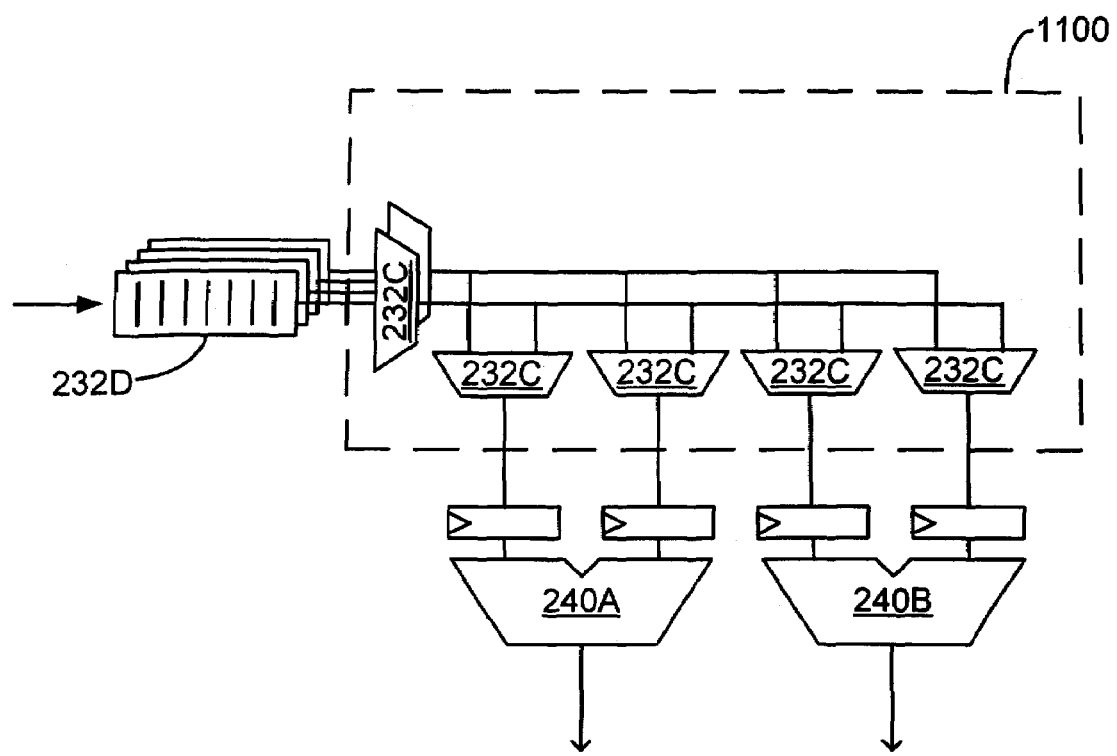
FIG. 11 is a block diagram of network coupling circuitry.

Scaling such a fully connected crossbar fabric to more network ports and input points incurs quadratic complexity in implementation area. Various approaches can be used to reduce this complexity by limiting the number of network ports that can be directed to pipeline inputs during the same cycle. In one approach shown in FIG. 11, network port coupling circuitry 1100 (shown in FIG. 11 coupling data into a portion of the pipeline 208) is configured to allow only a limited number of the network ports (two out of four possible ports in this example) to be read in any given cycle. This limits the complexity of the coupling circuitry 1100, which provides even greater chip area savings for a larger number of ports. This restriction in the number of network ports that can be read can be visible to the compiler and the compiler can make sure to adhere to this restriction while generating and scheduling subinstructions.

Another aspect of allowing a subinstruction to target both a register storage location in the register file 1010 and a static network port within the same instruction is providing enough bits in the VLIW instruction to encode the potential target locations for each subinstruction. One approach to limiting the number of bits used is to allow only one of the static networks to be written to in addition to a register file location. This reduces the number of bits used to target a network. For example, the subinstruction can use just two bits to encode one of four output port directions.

The DMA engine 806 provides a mechanism to off-load memory operations from the main processor 802. The main processor 802 communicates with the DMA engine 806 by reading and writing special purpose registers in the SPR set 1014. The main processor 802 sets up a DMA transaction by writing information identifying the data to be transferred and initiates the DMA transaction by setting a value in one of the special purpose registers. When a DMA transaction completes, the DMA engine interrupts the main processor 802. Alternatively, instead of receiving an interrupt, the main processor 802 poll a status register to determine when a DMA transaction completes.

The DMA engine uses a set of the SPRs to specify a local base address LBA in the local cache, a remote base address RBA in an external memory, and length L (in words) of a data transfer transaction. A sequence of L data words starting at RBA is transferred to a location starting at LBA. The DMA engine 806 communicates with the local cache using virtual addresses which are translated by a DMA translation lookaside buffer (DMA-TLB). The DMA engine 806 is connected to the dynamic network switch module 808 to send and receive dynamic network packets that include data, data access requests, and other memory management related messages. The DMA engine is configured to perform the following types of transactions: (1) a tile-to-memory transfer (or "preflush") to flush data from a local on-tile cache to an external memory, (2) a memory-to-tile transfer (or a "prefetch") to fetch data from an external memory into a local on-tile cache, (3) a tile-to-tile transfer to write data from a local on-tile cache in to a an on-tile cache of another tile, (4) a memory ping synchronization primitive to determine status of external memory transactions, and (5) a tile-to-tile synchronization primitive to determine status of tile-to-tile memory transactions. In some cases, the DMA engine limits the number of outstanding transactions to reduce complexity associated with managing the transactions.

6 Interface Modules

An array of tiles can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

Figure 12:
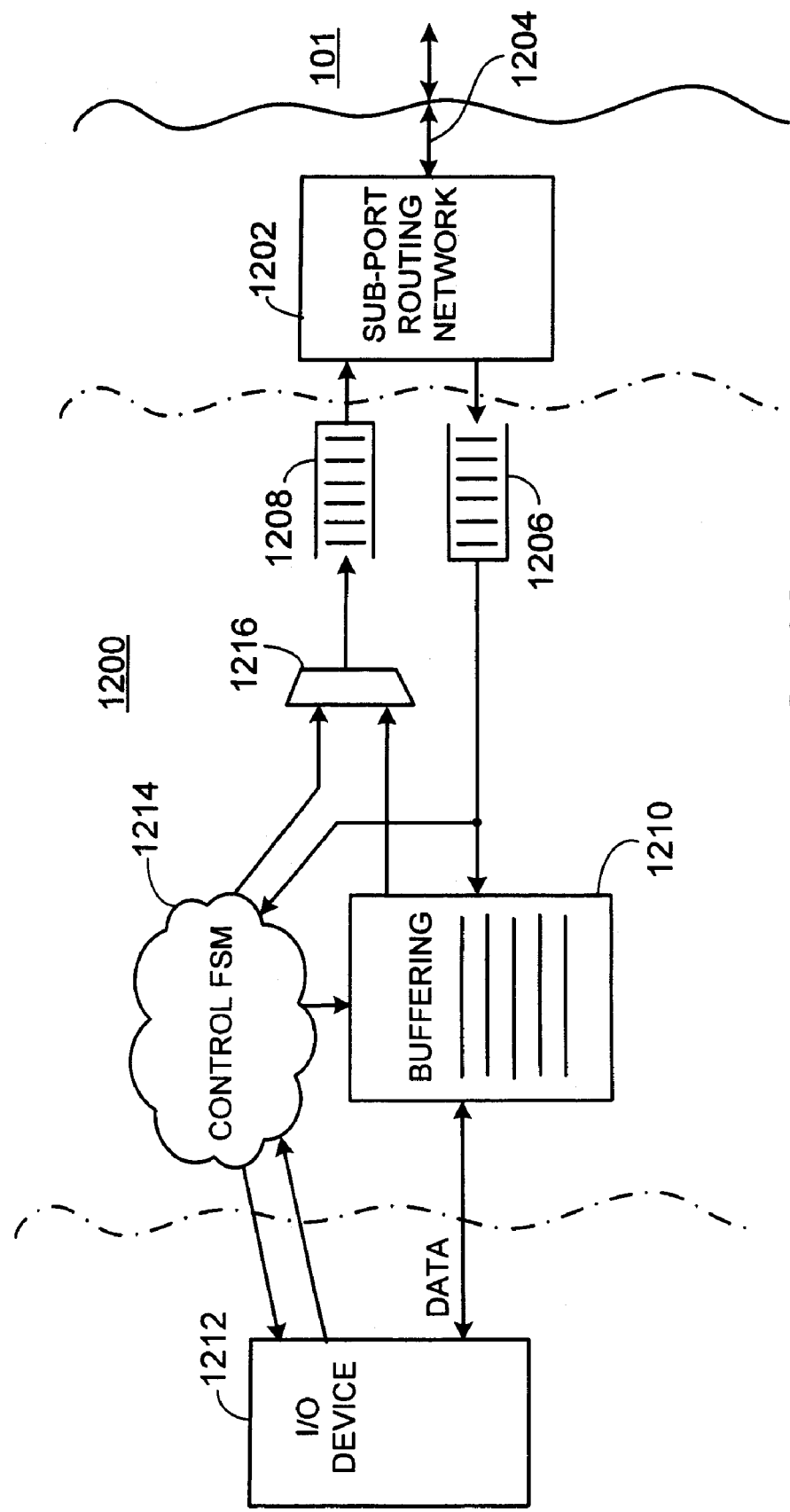
FIG. 12 is a block diagram of an interface module.

Referring to FIG. 12, an interface module 1200 is connected to a switch over the West switch ports of a tile located on the West edge of the tile array 101. In some cases it may be useful to multiplex a single switch point among multiple I/O devices. To enable such port multiplexing, a sub-port routing network 1202 routes traffic between multiple I/O devices and a link 1204 to and from the input and output ports of a network switch point. FIG. 12 shows one of multiple interface modules 1200 that can be coupled to the sub-port routing network 1202. The network 1202 uses a unique sub-port ID for each I/O device coupled to the network 1202, and routes traffic over the link 1204 to or from the appropriate I/O device according to the sup-port ID. Packets containing data or control messages for an I/O device are stored in an input queue 1206, and packets containing data or control messages to be sent into the tile array 101 are stored in an output queue 1208.

A buffering module 1210 includes an input buffer to store data arriving from the I/O device 1212 and an output buffer to store data to be provided to the I/O device 1212. The buffering module 1210 enables the interface module 1200 to provide end-to-end flow control for the dynamic networks, as described in more detail above.

A control finite state machine (FSM) 1214 reads control messages from the input queue 1206 and parses the messages. In some cases, the FSM 1214 applies control signals to the I/O device in response to the parsed control messages. The FSM 1214 also receives control messages from the I/O device and in some cases constructs messages destined for one or more tiles, an external memory, or another I/O device. An outgoing multiplexer 1216 selects the buffering module 1210 or the FSM 1214 as a source of data or control messages to be stored in the output queue 1208 for delivery to the appropriate destination.

As described above, the sub-port routing network 1202 enables multiple devices to share the same input and output ports of a dynamic network switch point. Additionally, the sub-port routing network 1202 enables a single device to support multiple independent connections over the same switch point. The sub-port routing network 1202 uses a unique sub-port ID to name each sub-port sharing a dynamic network port. A pair of input and output ports can share the same sub-port ID.

An interface module 1200 also supports an auto-configuration procedure for a program or operating system running on a tile to determine what I/O devices are connected to a particular port. An auto-configuration device discovery protocol running on one or more tiles scans all of the ports and sub-ports at startup. The program or operating system determines a map of sub-port locations for each of the I/O devices, and communicates setup information to each of the interface modules.

One exemplary type of interface module 1200 is the memory interface module that provides a memory controller interface to an external memory module. For example, a DDR-2 DRAM can be connected to a memory controller interface module that communicates with the tile array. The memory controller receives messages that are constructed by a tile's cache state machine, a tile's DMA engine, or another I/O device performing a device mastering DMA transaction. Exemplary transactions that can occur include read and write transactions transferring either a single word or multiple words in a cache line.

Another type of interface module that can be coupled to a tile array is a fabric chaining interface that couples the communication fabrics of tile arrays to provide a larger array having more computational power. Fabric chaining enables the networks of one tiled integrated circuit to be gluelessly connected to the networks of another tiled integrated circuit. When fabric chaining occurs, the tiles in one integrated circuit are capable of directly addressing tiles and memory in and connected to the another integrated circuit. In some implementations, the fabric chaining interface includes multiplexing circuitry to multiplex the network traffic from a set of tiles on an edge of an array across a communication link connecting the tile arrays. The communication link may have lower bandwidth and higher latency than supported by the networks on the integrated circuit. The fabric chaining interface ensures fair load balancing of the traffic carried on the link between the tile arrays, enabling forward progress on all networks in the face of congestion.

In some implementations, the interface uses a virtual interface technique in which one or more tiles at an edge of one tile array are physically connected to one or more tiles at an edge of another tile array, and other tiles at the edges of the arrays are virtually connected by redirecting messages to a physically connected tile. When a message sent from an origin tile on a first tile array to a destination tile on a second tile array is routed to a port of a tile that would send the message out of the communication fabric of the first array, a protection mechanism (such as the protection mechanism described below) triggers an interrupt on the processor on the tile. If the tile is physically connected over a communication link to the second array (e.g., over an I/O pin), the interrupt handler running on the processor sends the message over the link. Otherwise, if the tile is not physically connected to the second array, the interrupt handler forwards the message to a tile in the first array that is physically connected to the second array. To forward the message, the tile appends a new destination header and other wrapper information to the original message. A controller (e.g., a PCI Express interface) running on the connected tile of the first array then forwards the message over the link to a corresponding controller running on a tile of a second array. The controller on the second array then forwards the message to the destination tile on the second array. The destination tile receives the message without needing to be aware that the virtual interface technique was used during the transfer between tiles.

A fabric chaining interface can use any of a variety of protocols and hardware and/or software techniques to provide communication between tile arrays. The interface can use a communication protocol such as PCI Express, XAUI, SPIE, GPIO, or Ethernet, for example.

7 Protection System

A protection system facilitates debugging and helps to prevent programmer error. For example, one approach to facilitate debugging a complex system is to segment the system into pieces, each of which is only responsible for a subset of the tasks of the complex system. Each piece of the complex system is then restricted to accessing the data that it requires to complete its assigned task. Protection aids the programmer by disallowing one piece of a system from inadvertently modifying a different piece of the system.

The protection system for a tile array enables multiple operating systems or embedded supervisory processes to share access to the networks, the memory address space, and the coupled memory modules and I/O devices. The system also takes into account that programming for a complex many level protection system can be a challenge and many applications may not need to use all of the protection mechanisms available. To allow simple applications that do not need a multi-level protection system to stay simple, protection mechanisms available in the protection system can be disabled if not needed.

In one implementation, the protection system includes four levels of protection. The protection levels are labeled 0-3 with protection level 0 being the least privileged protection level and level 3 being the most privileged protection level. The levels are: level 0 (the User level), level 1 (the Supervisor level), level 2 (the Hypervisor level), and level 3 (the Virtual Machine level). The protection levels operate according to a hierarchy in which software processes or hardware modules executing at one protection level is afforded of the privileges of that protection level and of lower protection levels.

Resources within the tiled integrated circuit that are managed by the protection system are associated with a minimum protection level (MPL) register. The MPL register contains a value from 0-3 which is the minimum protection level that is needed to complete a desired action using the protected resource without faulting. The MPL registers can be mapped into the SPR set 1014.

Portions of a tile that are configured to perform actions using protected resources are associated with a current protection level (CPL) register. The CPL register contains a value from 0-3 which determines the protection level currently associated with the portion of the tile taking the action. For example, there is a respective CPL register associated with the main processor, the switch processor, the DMA engine, the UDN, and the IODN. In some cases, the main processor 802, switch processor 920, and DMA engine 806 are configured to use the same CPL value.

Before an action associated with a protected resource is completed, the MPL value associated with the resource is compared with the CPL value of the portion of the tile taking the action. If the MPL value is less than or equal to the CPL value, then the action completes in a non-exceptional manner. If the MPL value is greater than the CPL value, an interrupt occurs. The interrupt occurs before the violating action completes. The protection interrupt interrupts the main processor 802 using an associated interrupt handler. The associated interrupt handler is executed at the minimum protection level. A process running on the main processor 802, for example, can set the MPL registers following certain rules. A process executing with the CPL of the main processor 802 at or above the MPL value contained in a MPL register is allowed to change the MPL value stored in the register lower or higher up to the associated CPL value without faulting. If a process attempts to change an MPL register that stores a higher value than the associated CPL value, a general protection violation interrupt occurs at the protection level stored in the MPL register. If a process attempts to change an MPL register to a level higher than the associated CPL value, a general protection violation interrupt occurs at the protection level of the associated CPL.

The protection system is configured to provide protection mechanisms at choke points in the tiled integrated circuit architecture. A choke point is a point at which the flow of data can be controlled. To provide protection, when a violating data pattern is observed at a choke point, a protection interrupt is signaled.

One example of a protection mechanism is the protection of physical memory using a physical address lookaside buffer (PALB). The PALB provides a mechanism to restrict what can be written to a tile's TLB. This mechanism provides a way to protect one tile's operating system from another. This protection mechanism can be used in any multicore chip that is configured to run multiple operating systems on respective sets of one or more processor cores, where for example one of the operating systems might not be trusted.

For example, the PALB restricts what a TLB entry may contain. The PALB also restricts accesses to physical memory when the processor is in an untranslated mode that uses physical addresses directly without needing translation of a virtual address to a physical address. The PALB can be managed by a "hypervisor process" associated with a hypervisor protection level (CPL=2), which allocates regions of memory to respective operating systems (e.g., operating systems running on different sets of one or more tiles). The regions of memory covered by the PALB can be larger than the pages used by a TLB. If there is a miss in the PALB, a fault typically traps to the hypervisor process that handles the fault.

Alternatively, a more software oriented approach can be used to provide a protection mechanism in multicore chips. In this approach, the hypervisor does not write into a hardware PALB structure to protect the TLB. Instead, the hypervisor performs the check and guarantees that the page table is protected. Thus, when the operating wants to install a page table entry the operating system asks the hypervisor to do so. The hypervisor, in software, checks whether the page table entry requested is valid, and if so, installs it in the page table. In this implementation, only the hypervisor is allowed to write the page table entry. If the operating system has requested an invalid page then the hypervisor can take one of many actions in response. For example, the hypervisor can kill the operating system process that made the request.

Another example of a protection mechanism is the protection of access to networks. One aspect of network protection is the ability to configure tiles to allows or disallow an instruction to write to or read from a particular network (or "global network protection"). By restricting network access, a process can be restricted from accessing a network that is reserved for a process with a higher protection level. Another aspect of network protection is the ability to prevent a tile from sending messages on a specified network to a first tile, while allowing the tile to send messages on the specified network to a second tile (or "inter-tile network protection").

In one implementation of inter-tile network protection each outbound link from a specified output port on the UDN, IODN, and static network is associated with its own MPL register. If the CPL register value associated with a network is less than the MPL for a given link of that network and a process attempts to send a message down one of those links, an interrupt to the MPL occurs. Different networks are associated with different CPL registers to allow different networks to run at different protection levels.

Figure 13:
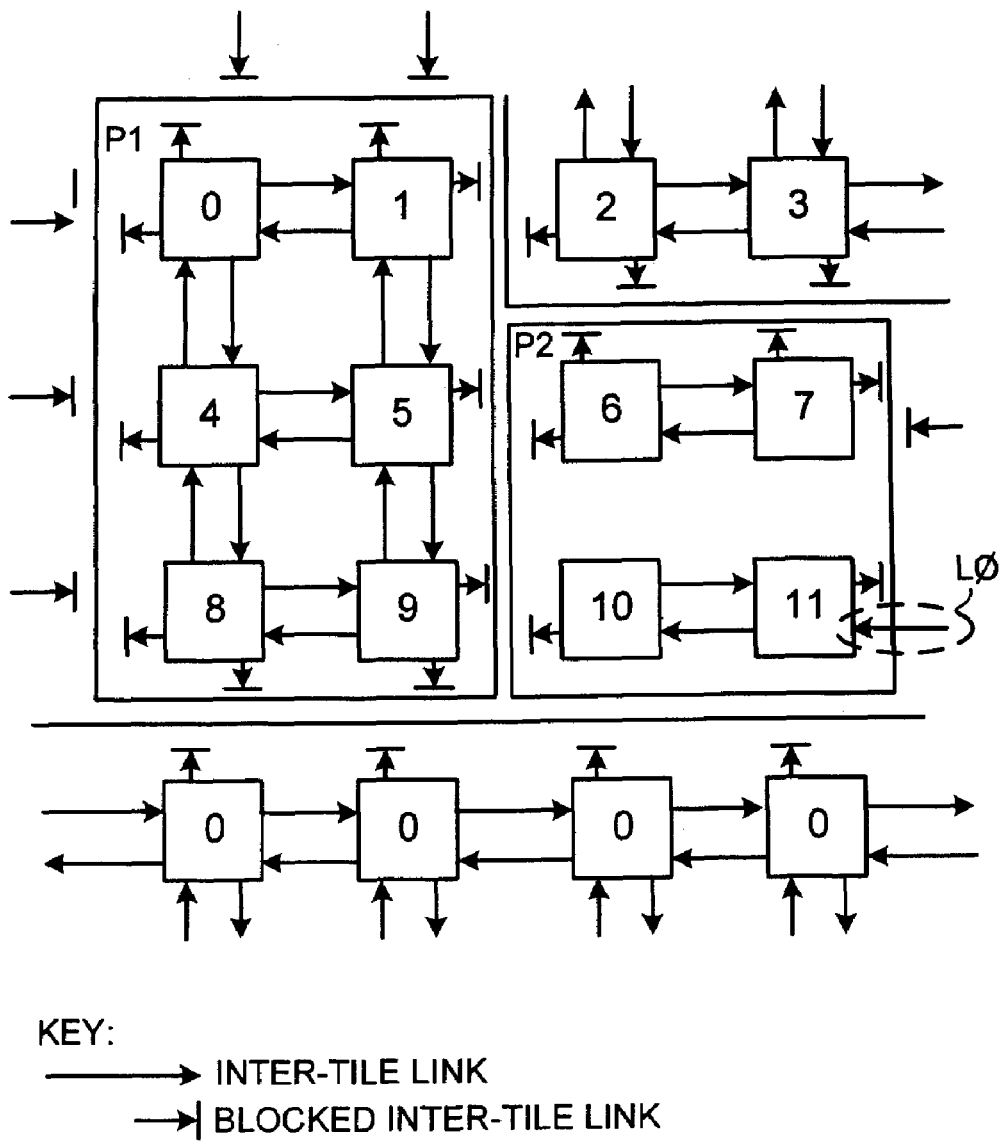
FIG. 13 is a diagram of protection domains in a tile array.

Inter-tile network protection can be used to form "protection domains" across the tile array. The protection barriers can be thought of as hardware enforced firewalls. Referring to FIG. 13, a portion of a tile array showing 16 tiles labeled 0-15 includes two rectangular protection domains P1 and P2. The tile evaluates protection for given link of a given network on egress. If an instruction attempts to forward data out of a protection domain, the tile triggers an interrupt. Since protection is evaluated separately on each side of a link, it is possible to have unidirectional protection domains where traffic across a link in one direction is allowed, and traffic in the opposite direction on the same link is denied. Link L0 in FIG. 13 is an example of a unidirectional protected link. In implementations in which the dynamic networks use dimension-ordered routing, the protection domains can be rectangular in shape to facilitate communication within the protection domain. Protection domains can be used to define subsets of tiles that are configured to run independent operating systems. The hierarchical layers in protection system also help to enable multiple processes communicating over the networks to communicate with the same physical devices using a physical device multiplexing approach. For example, multiple processes running on different tiles may want to interact with one network device. The protection system provides virtual device application programming interfaces (APIs) to allow physical device multiplexing. In this approach, a physical device driver is associated with the hypervisor protection level. A supervisor device driver uses a virtual device API to interface with a hypervisor process and provide the appearance of a separate physical device. It is the hypervisor's responsibility to verify that a desired operation is legitimate and to provide a manner in which to multiplex access to the physical device between multiple supervisor device drivers.

Figure 14:
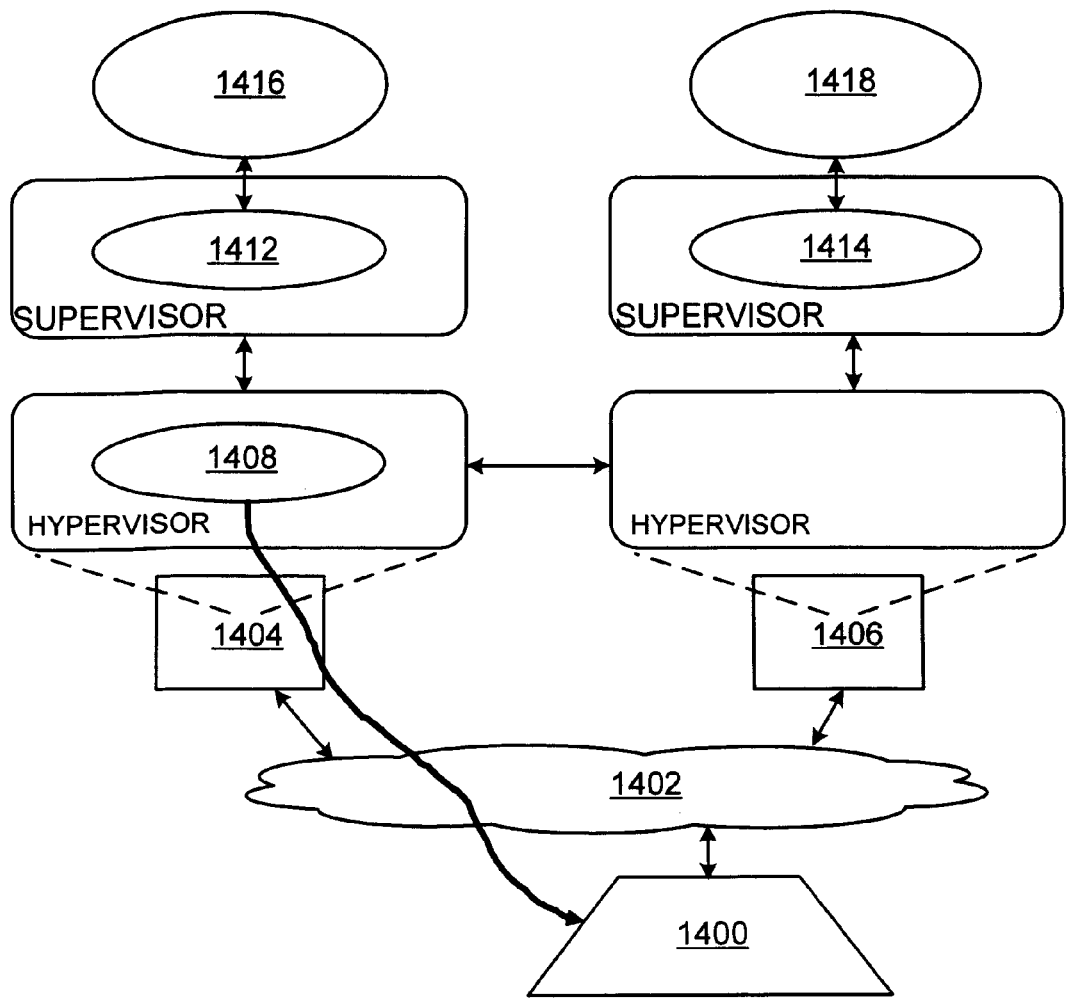
FIG. 14 is block diagram of a physical device multiplexing approach.

Referring to FIG. 14, the physical device multiplexing approach can be used in a tiled integrated circuit, or in any integrated circuit that includes a physical device 1400 coupled to an interconnection network 1402 connecting multiple processors 1404 and 1406. The interconnection network 1402 can include any type of interconnection network including a mesh, a ring, a bus, or a fully connected crossbar fabric.

The physical device 1400 (e.g., an Ethernet device) is in communication with a physical device driver 1408 running in the first processor 1404 (e.g., a first tile). The device can be internal or external to the integrated circuit. The second processor 1406 (e.g., a second tile) may want access to this device 1400. In this example, each processor is running a different operating system. Alternatively, processors in one set of tiles is running one operating system, and processors in another set of tiles is running a different operating system (the different operating system can be a different type of operating systems, or an independent instance of the same type of operating system). The physical device multiplexing approach enables a single physical device to be multiplexed between separate user processes 1416 and 1418 running on separate processors running separate operating systems mediated by hypervisor processes running in each processor. The hypervisor processes coordinate to provide a single logical "hypervisor layer" across multiple processors/operating systems.

The hypervisor layer provides a physical device driver for each physical device. In this example, the physical device driver 1408 coordinates access to the physical device 1400. The hypervisor layer provides the appearance of a unique physical device within each operating system by accepting potentially interleaved access requests from the operating systems. The hypervisor layer enables each operating system to access the device without the operating system needing to lock the device for access by only that operating system (e.g., there is no need for the operating system to negotiate for a lock to access the device). The physical device driver in the hypervisor layer maintains independent state information associated with access requests from different operating systems. The user processes 1416 and 1418 make device access requests to respective supervisor device drivers 1412 and 1414 running in the respective operating systems of the respective processors 1404 and 1406. Then the supervisor device driver makes a request into the physical device driver which resides at the hypervisor layer. The physical device driver 1408 determines which supervisor device driver request to satisfy and how to multiplex the physical device 1400 among multiple operating systems and users.

8 Interrupts

Interrupts (e.g., "exceptions" or "traps" or "faults") include conditions that cause an unexpected change in control-flow of the currently executing instructions. The main processor 802 is configured to process interrupts generated by processors of other tiles, or other modules such as the cache module 804, DMA engine 806, or switch modules. The other modules in a tile may stall operation when an interrupt occurs, but are typically not directly responsible for processing an interrupt.

An interrupt is typically reported only to the localized tile(s) to which that interrupt is relevant. By localizing interrupt reporting, dedicated global structures or communication mechanisms are not necessarily needed for interrupt reporting. If a local interrupt needs to be reported to a remote location, the operating system communicates the relevant information over one of the networks.

The interrupt structure of the tile array is tightly integrated with the protection system. There is a minimum protection level (MPL) for each possible interrupt that can occur. The MPL is used to indicate a minimum protection level needed to take some action in the processor without faulting, and to indicate the protection level at which a corresponding interrupt handler executes. Some faults occur regardless of protection level. Examples of these faults are TLB misses and illegal instruction faults. For faults that occur regardless of protection level, if the CPL is less than the MPL for the corresponding interrupt, the interrupt occurs at the MPL for the interrupt. If the CPL is greater than or equal to the MPL for the corresponding interrupt, then the interrupt is executed at the CPL.

The processors use a vectored approach to handling interrupts. On an interrupt, a tile changes the program counter to an offset from the address zero. The offset is derived from the interrupt number and the protection level at which the interrupt is to be executing. For example, the offset is the protection level multiplied by the number of interrupts added to the interrupt number all multiplied by 256. This allows for 16 VLIW subinstructions to be included in each interrupt vector. There are four sets of interrupt vectors—one for each protection level. If more subinstructions are needed to handle an interrupt, these 16 subinstructions can be used to jump to the location of the rest of the interrupt handler. The 16 subinstructions in each vector location provide the handler code space to quickly determine if further processing is needed. If no further processing is needed, the handler can simply return from the interrupt, otherwise the handler can jump to code that completes further interrupt handling.

External interrupts are interrupts that are sent to a tile from an entity outside the tile. The other entity may be another tile or I/O device. Each tile can handle four independent external interrupts. An external interrupt is signaled by a message arriving over the IODN to a particular de-multiplexed port. On the IODN, there are four hard-coded inbound hardware de-multiplexed queues for external interrupt delivery. To signal an external interrupt, the initiating entity sends an IODN message to the target tile's external interrupt queue. Once received, the message is interpreted as an interrupt and the appropriate external interrupt handler is signaled.

After an interrupt has been processed by the interrupt handler, the operating system sends an end-of-interrupt (EOI) message to the source of the interrupt indicating that the interrupt has been fully processed. The EOI message also indicates that the tile's processor is ready to process further interrupts. Thus, EOI messages provide a mechanism to flow control incoming interrupt messages.

External interrupt messages can arrive unsolicited to a tile. If interrupt messages cause congestion on the IODN, a deadlock recovery mechanism as described in U.S. patent application Ser. No. 11/314,270, incorporated herein by reference, can be used to provide a fully distributed, deadlock recoverable, flexible interrupt mechanism.

In some cases, one tile's code is able to interrupt another tile's code. In order to do this, tile-to-tile interrupts are used. Tile-to-tile interrupts use the external interrupt mechanisms available to a tile. In order for a tile to launch a tile-to-tile interrupt, it constructs and sends a IODN message which is in the appropriate format to another tile.

When an "external entity" outside of the tile array, or outside of the integrated circuit sends an interrupt message, the interrupt is handled by a software interrupt handler running on one of the tiles. In constructing the interrupt message, the external entity determines the correct tile to which the interrupt message should be delivered. The interface module coupling the external entity to the tile array is able to determine how to steer interrupts without needing to coordinate with a central interrupt mechanism. This lack of required centralized processing of interrupts improves the scalability of the interrupt mechanism.

One example of an interrupt steering mechanism is one in which a driver configures a device to send an interrupt message to a predetermined tile. Using this mechanism, the device constructs an external interrupt message formatted to be sent over the IODN and sends the message to the predetermined tile. After the interrupt has been handled, the tile issues an EOI to the device. External devices can implement more elaborate steering messages such as round robin interrupt distribution or other interrupt load balancing mechanisms.

9 Memory Management 9.1 Memory Translation and Caching

Internal to a tile, memory is addresses are typically virtual addresses (e.g., 32-bit virtual addresses, or 64-bit virtual addresses). External to a tile, memory addresses are typically physical addresses (e.g., 64-bit physical addresses, or 40 bit physical addresses). The main processor 802 processes load and store instructions using 32-bit virtual addresses, which are then translated to 64-bit physical addresses. Address translation is performed using either the TLB in "translation mode," or using an address extension register (AER) in untranslated "physical memory mode." In either mode, a physical address is mapped to an address in one of the coupled external memory modules (e.g., a DRAM coupled over a memory interface module) of the copious memory backing store using a memory mapping technique described in more detail below.

Translation mode is used with processor instruction fetch, switch instruction fetch, main processor data accesses, and DMA data accesses. Physical memory mode is used by main processor data accesses. In translation mode, a TLB translates a virtual address into a physical address. In physical memory mode, a physical address is extended with a suffix from an address extension register (AER). The memory address generation mode used by the main processor is determined by a global special purpose register called the PHYSICAL MEMORY MODE (PMM) register.

Figure 15:
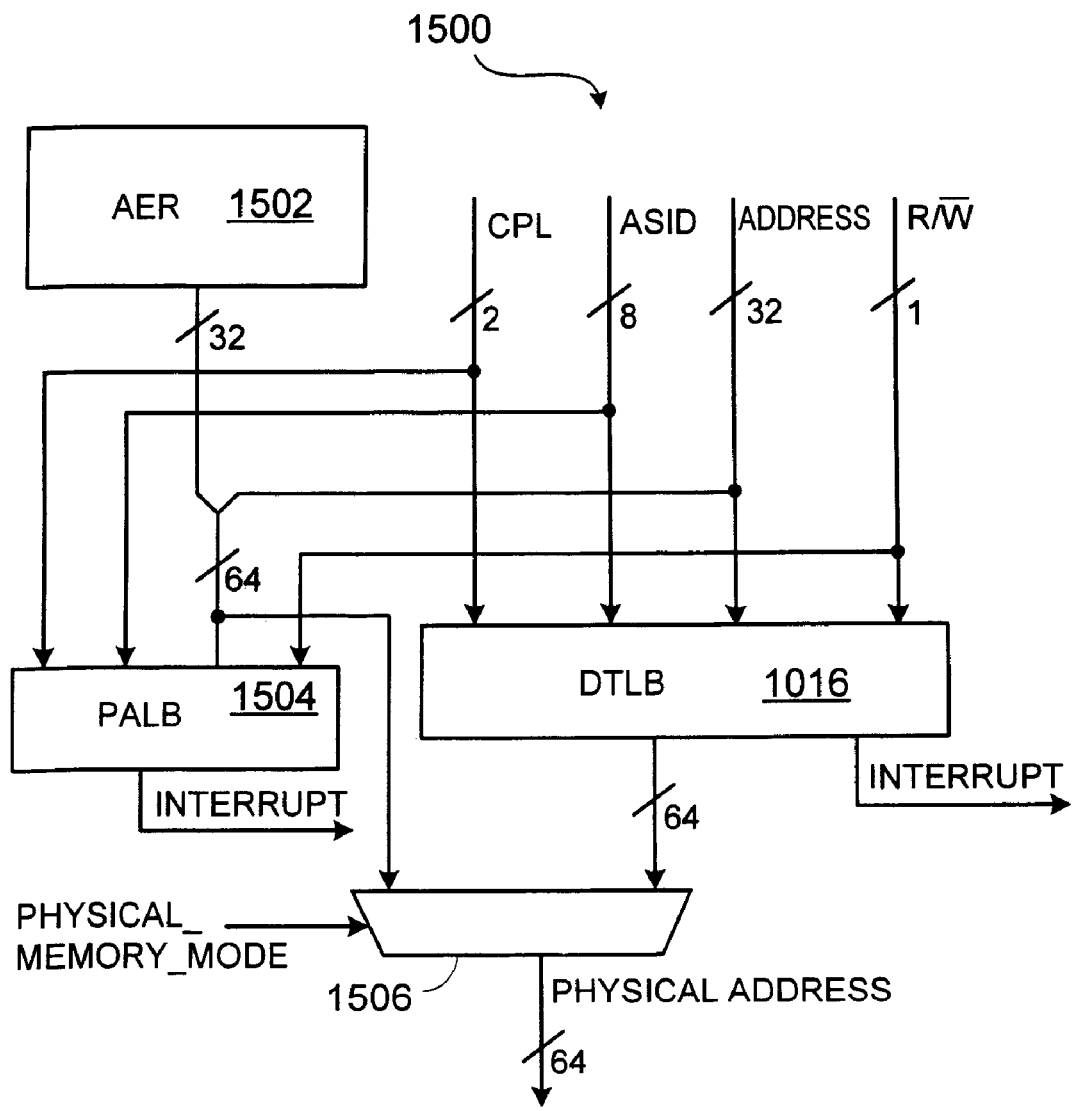
FIG. 15 is a block diagram of a memory translation circuit.

FIG. 15 shows memory translation circuit 1500 that can be used in the main processor 802 to provide memory address translation using the DTLB 1016, or memory address extension using the AER 1502 based on a PHYSICAL_MEMORY_MODE value stored in the PMM register. This circuit 1500 takes 32-bit addresses which are used internal to a tile and translates them into 64-bit physical tile-external addresses. Virtual memory addresses for main processor instruction fetch, switch processor instruction fetch, and DMA memory access are translated directly in the ITLB, SWITLB, and DMATLB respectively.

The physical address lookaside buffer (PALB) 1504 provides a mechanism to restrict what can be written to a tile's DTLB 1016. This mechanism can be used, for example, to protect one tile's operating system from another tile's operating system. The PALB restricts what a written DTLB entry may contain. The PALB also restricts accesses to physical memory when the processor is in physical memory mode. The PALB is typically managed by the hypervisor which allocates memory regions to respective operating systems. The regions of memory covered by the PALB are potentially larger than the pages used by the DTLB. If there is a miss in the PALB, a corresponding interrupt is handled by the hypervisor.

Alternatively, as mentioned earlier, the PALB function can be performed by the hypervisor in software.

In physical memory mode, the PALB concatenates the address extension register (AER) contents with the provided virtual address. The AER provides the upper 32-bits to generate a full 64-bit physical address. To provide memory protection while in physical memory mode, the PALB is queried to protect physical memory from illegal accesses. Access to the PMM register is protected in the same manner as writes to a generic DTLB entry. Thus, the minimum protection level needed for writes to the DTLB dictates whether the PMM register can be written.

The tiles use hybrid hardware/software memory translation approach in which the common case of address translation (i.e., a hit) is handled by the DTLB 1016, and the uncommon case of protection violations, or missing mappings signal are handled by a software handler executed by the main processor 802.

The DTLB 1016 maps regions of virtual memory to regions of physical memory in units of a page. Multiple page sizes can be used. For example, some implementations provide page sizes of: 4 KB, 16 KB, 64 KB, 256 KB, 1 MB, 4 MB, and 16 MB. Multiple page sizes allows the size of a page to be traded off against the storage needed to store a page table. Also, large pages can be used to increase the amount of data that can be mapped with one DTLB entry.

For each page, the DTLB also stores information associated with the addresses mapped to the page. For example, a DTLB page entry includes the following fields.

Virtual Page Number (VPN): The upper bits of a virtual address. The VPN and optionally a ASID (described below) comprise a key that is used for matching a virtual address to a physical address upon accessing the DTLB. The Page Size field (described below) determines how many bits of the VPN are used in the key. For a smaller the page size, more VPN bits are used in the key. For a larger the page size, fewer VPN bits are used in the key.

Address Space Identifier (ASID): An ASID is an identifier that allows the operating system to leave multiple valid DTLB entries for different processes without flushing the entire TLB on a context switch. ASIDs are 8-bit values, thus there can be up to 256 different process's address space entries in the DTLB at one time.

Global (G): This field denotes whether a DTLB entry is global across ASIDs. If the global bit is set, then the ASID is not used in the key.

Page Size (PS): This field encodes the size of the pages corresponding to the DTLB entry.

Physical Frame Number (PFN): When an address to be translated matches the DTLB entry's key, the PFN is used to generate a 64-bit physical address. The PFN replaces the top bits of the address according to the Page Size.

Red Evict (RE): This field determines whether memory accesses translated according to this DTLB entry can evict a "red" cache line, according to the red-black caching technique described below.

Black Evict (BE): This field determines whether memory accesses translated according to this DTLB entry can evict a "black" cache line, according to the red-black caching technique described below.

Location Override (LO): This field determines whether a remote fetch mapping uses a "location override" memory map or the default memory map, according to the location override technique described below.

Cached (C): This field determines whether memory locations within the corresponding page can be cached in the local on-tile cache.

SiNgly-Cached (SNC): If a memory location can be cached, the SNC field determines whether the memory location is cached in the cache of a single tile, according to the SNC mode described below.

Writable (W): This field determines whether the corresponding page is writable. If a write occurs to a non-writable mapped page, an interrupt occurs.

Valid (V): This field denotes whether a TLB entry is valid. If an entry is invalid, the entry is ignored.

Location Override Target (LOTAR): A MDN location to be used if LO is set and non-local memory is needed.

The DTLB provides a mechanism to override the default memory location to be accessed when a memory address is remotely fetched. A memory address is remotely fetched when memory is being accessed in an uncached mode or when a cache miss occurs (i.e., the address is not stored in the local cache). To override the default memory map, the remote address's corresponding TLB entry should have its LO field set. When the LO field is set, the memory system utilizes the LOTAR field to determine where the memory request should be sent.

The default memory map and the memory map provided by the LOTAR field enable the MDN to route a physical address to the appropriate storage location in a coupled memory module. For example, physical address can include information identifying the destination tile and the final destination (e.g., network port) of the coupled memory module, as well as a memory address within the memory module.

The LOTAR field can also be used together with the C and SNC fields to implement a SNC mode. The SNC mode provides a mechanism for a set of physical memory pages to be cached across the local on-tile cache modules of multiple tiles (or all the tiles) without needing to use cache coherence techniques to maintain cache coherence. A set of physical memory pages is cached locally in the on-tile cache module of exactly one tile (the SNC "home tile"). Other tiles ("remote tiles") are configured to access addresses in those memory pages by communicating with home tile's cache. If there is a cache miss in the home tile's cache, then the home tile accesses the addresses from the copious memory backing store.

The SNC field is used to indicate that a memory page is being managed in SNC mode. For the "local tile" storing a memory address locally, the C field on the corresponding DTLB page is set. For other "remote tiles," the C field on the corresponding DTLB page is not set and the LO field is set with a LOTAR field set to point to the cache location of the tile local tile. When a remote tile's processor attempts to access the memory address, the tile sends a request message to the override location asking for the data. After receiving the data, since the C field is not set on the remote tile, the remote tile does not store the data in its local cache. Therefore, each address remains cached in a single on-tile cache module, obviating the need for a cache coherence protocol. The SNC mode is not limited to operating on cache lines of data, but can operate on bytes, half-words, or words at a time.

An example use of the SNC mode is one where 16 KB of data is to be shared across four tiles. The four tiles are numbered 0, 1, 2, 3. The four tiles use their on-tile cache modules to cache data from the four respective memory ranges 0-4 KB, 4 KB-8 KB, 8 KB-12 KB, and 12 KB-16 KB, each memory range comprising a 4 KB page (pages 0, 1, 2, 3). Thus, for page 0, the corresponding DTLB entry on tile 0 (the home tile for page 0) is indicated as cached (C=TRUE) without a location override (LO=FALSE). On the remote tiles 1, 2, and 3 the DTLB entry for page 0 is indicated as not cached (C=FALSE) with a location override (LO=TRUE) and the LOTAR set to the location in the local cache of tile 0 that stores page 0. Likewise, page 1 is cached locally on tile 1 and is overridden to tile 1 on tiles 0, 2, and 3; page 2 is cached locally on tile 2 and is overridden to tile 2 on tiles 0, 1, and 3; and page 3 is cached locally on tile 3 and is overridden to tile 3 on tiles 0, 1, and 2. If a location override request to a remote tile results in a cache miss, then the remote tile makes another request for the data from the copious memory backing store.

As a variation of SNC mode, a tile can have the C field set, in addition to the LO field, to use both location override and local caching. This mode is particularly useful for accessing read only data, such as instruction accesses—which refer to pages that are mostly read-only. On a memory access by a requesting tile, if the C and LO fields are set in the requesting tile, then the tile fetches the data from the tile specified by the LOTAR field—the home tile for the SNC data—and also caches the data locally. The data fetched can be an entire cache line, for example. In this mode, cache hits at the requesting tile are supplied by the local cache on the requesting tile, while misses are satisfied by the home tile. As before, a miss on the home tile, in turn, goes to the copious memory backing store to be satisfied.

A tile can also be configured to handle write requests associated with cache lines for which both C and LO fields are set. If a requesting tile requests access to a memory address and might need to write to that address now or at some point in the future, then the tile moves the home tile of the cache line containing the address to the requesting tile and invalidates the corresponding cache line on the former home tile. The operating system is notified so that the TLB entries on the former home tile and on the requesting tile can be updated to reflect the new home location.

In the SNC variations described above, the location is cached in only one cache at any given time, unless the data is read-only. This singly cached model ensures correct operation in the presence of data that can be modified. When the C and LO fields are set in a local tile, upon a request from the local tile, a data value from another tile's cache is brought into the local tile's cache. A case in which this data value can be modified is handled with care. When a tile's main processor or DMA engine writes such a data value in the tile's local cache, the tile can be configured to use a write-through policy to update the data to the cache of the home tile. The tile does not mark the local copy of the data value as invalid or "dirty". If the local copy were to be marked as "dirty", then the data would be written back in response to that cache line being evicted. Normally, data is written back to copious memory. However, for this location, the data would need to be written back to the home tile. In this case, tile is not able to write the data back to the home tile because the cache does not store the identity of the home tile (the home tile information for a given page is not in the cache, rather it is in the TLB). Thus, by not marking the local copy as dirty, the tile avoids writing back the local copy.

The SNC mode can also be used in conjunction with a page-based distributed shared memory (DSM) mode that implements coherent shared memory. A DSM scheme implements a directory (or "page table") in hardware or software to keep track of the caches in which copies of a page might be located. As one DSM solution, when a processor tries to write a memory address, then the corresponding page is invalidated from all the other caches, and the writing processor becomes the sole owner of the page. A page can be cached in multiple locations (read-shared) as long as the corresponding processors are reading the data on the page. When a processor tries to write a page that is currently declared as read-shared (e.g., through a marking in a TLB or in a page table), then a DSM runtime system is invoked (e.g., through a trap) which looks up the locations where the page is cached and then sends messages to those processors to invalidate their page copies. When a processor stores a page, information identifying the processor is entered into the page tables that track copies of the page. The DSM mode provides potentially faster access to certain memory addresses that can be cached on multiple tiles, at the cost of overhead of implementing a cache coherence protocol in the shared memory. Thus, in DSM mode, a writable page can be cached, but its location can move around from one tile to another as different processors write to the page. A runtime system can examine the sharing patterns of a program and determine whether it is preferable to share memory using the SNC mode or by using the DSM mode. Furthermore, the tiles are able to switch between SNC mode and DSM mode on the fly depending on the characteristics of a particular application.

For example, all pages, or all shared pages (e.g., pages that have been allocated using some kind of shared allocation request, such as "malloc-shared"), can start out using DSM. If a page is observed to be bouncing around excessively between tiles (e.g., as determined by a count of invalidations for each page in the DSM runtime system) then the page can be switched to use SNC mode. With SNC mode, the page has one home location and so will not bounce around. Rather, all read or write requests to a memory address on the page will be directed to the home tile that caches that page. A page can also revert from SNC mode to a DSM mode under certain conditions (e.g., after a certain amount of time has passed since it was turned from DSM into SNC mode).

The RE and BE fields are used to implement a red-black caching technique that can be used to pin a set of memory addresses in a cache. The pinned memory can be used, for example, as a local scratchpad memory resource for a process. The fields provide a way to prevent memory access of one class of data from evicting cache entries (e.g., cache lines) associated with another class of data. In a red-black cache, data stored in the cache is associated with one of three classes. Data associated with the first class ("red data") is allowed to evict cache entries storing red data. Data associated with the second class ("black data") is allowed to evict cache entries storing black data. Data that is not classified as red or black, or is associated with a default third class ("green data"), is allowed to evict either red or black data.

Data is classified as red or black according to the DTLB entries: when the BE field for the corresponding DTLB entry is set and not the RE field, the data is black, and when the RE field for the corresponding DTLB entry is set and not the BE field, the data is red. If both the BE and RE fields are set, the data is green. Thus, in this example, data is classified as red or black at the granularity of a page. Other granularities are also possible.

Figure 16A:
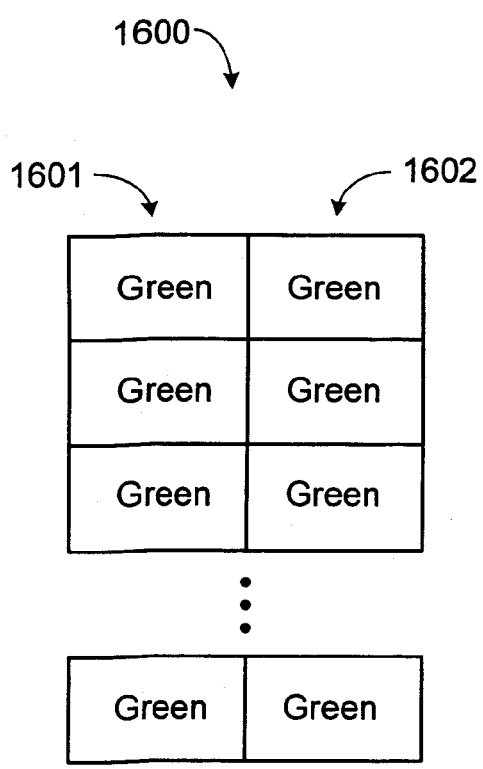
FIGS. 16A and 16B are diagrams of a set-associative cache.

Some implementations use a set associative cache to manage red and black cache entries. Referring to FIG. 16A, a 2-way set associative cache 1600 includes a first set of entries 1601 (or "Way 0") and a second set of entries 1602 (or "Way 1"). Data from a given physical address can be stored in one of two entries, corresponding to either Way 0 or Way 1. Before a cache entry has been used to store an address associated with data classified as red or black, the cache entry is classified as green. FIG. 16A shows the cache 1600 in an initial state before any entries have been pinned down.

Figure 16B:
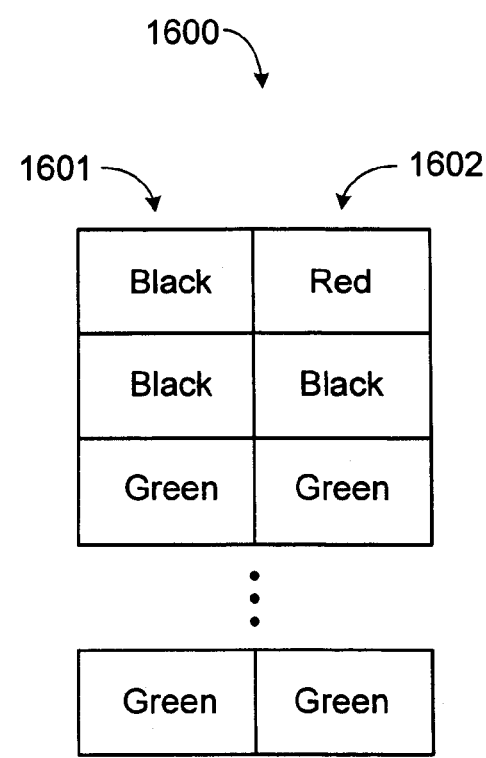

The cache module 804 stores one class of data in Way 0 (e.g., black) and another class of data in Way 1 (e.g., red). When black data is being stored in the cache, the cache module 804 stores the data in Way 0 and designates the corresponding Way 1 cache entry for red data. When red data is being stored in the cache, the cache module 804 stores the data in Way 1 and designates the corresponding Way 0 cache entry for black data. One way for a process to designate a Way 0 entry for black data, for example, is to walk through the DTLB and classify all pages with addresses that could map to that Way 0 entry as black. FIG. 16B shows the cache 1600 after two entries have been pinned down as black.

Using this approach, a process can reserve a portion of the cache for storing data that will not be evicted by any other process by marking memory pages as black using the DTLB entries. The reserved portion of the cache can then be used by the process as a small pinned memory scratchpad, or as a private cache for a larger portion of memory. For example, if the process wants to ensure that the memory is pinned and is not evicted by either red data or other black data, a block of pages that map to non-overlapping entries in Way 0 can be classified as black. Thus, the pinned memory is less than or equal to half of the cache size. Alternatively, if a process classifies a larger portion of memory as black, the memory can be a private memory space that will spill to copious memory if necessary.

Alternative implementation are possible, including, for example, implementations that use more than 2 classes mapped to respective ways of a set associative cache.

9.2 Copious Memory Access and Memory Mapping

Copious memory controllers (e.g., memory interface modules) ensure that messages to and from a single entity (e.g., a tile or I/O device) are handled in the order in which they are issued by the entity. Also, the memory modules can provide sequential consistency for memory read and write operations as seen by the copious memory controller. The memory controller may determine the actual ordering that occurs at a memory module and may reorder messages coming from multiple distinct entities. A copious memory controller ensures forward progress of memory access requests by ensuring that requests from any entity is processed in a timely manner.

While a memory controller provides sequential consistency, a memory controller does not necessarily guarantee that the inter-entity memory access ordering is related to message arrival ordering. Also, there are not necessarily any memory ordering guarantees between two different memory modules.

External memory modules are typically located at an edge of a network, which introduces dynamic latency Also, different entities experience different latencies when communicating with a given memory module. Therefore, memory ordering as seen by an entity may not correspond to a global time ordering in which memory operations occur within a particular tile or I/O device. This non-uniform memory ordering should be accounted for when two entities are communicating via memory.

An example situation to be handled appropriately is one where two tiles are communicating via data sent over a network to a memory module. In this example, a first tile (tile A) writes data to a region of memory and a second tile (tile B) reads the same region of memory. To prevent stale data from remaining in tile A's cache, tile A flushes the shared data from its cache before sending the data back to memory. After flushing the data, tile A communicates that data is ready to be read by sending a message on the UDN to tile B. Tile B receives the message and begins reading the memory range written by tile A. It is possible that tile B's read requests are processed by the copious memory controller before the memory write requests from tile A have reached the memory controller. Thus, in this example, tile B may end up reading stale data.

One approach to handling this situation is to use a memory ping instruction. This instruction allows a tile or I/O device to ping a particular memory device to ensure that previous memory transactions (e.g., load or store requests) from a particular tile or I/O device have completed before continuing. Thus, in the previous example, if tile A had pinged memory before sending tile B the message indicating the data is ready to be read, tile B would have received the correct data.

Another type of instruction used for managing latency is a memory fence instruction. In one implementation, if a memory fence instruction is issued by a tile, then the cache controller on that tile verifies that all memory transactions to all memory controllers or other tiles, including SNC requests, are completed before continuing. Issuing a memory fence instruction is equivalent to issuing multiple ping instructions corresponding to each memory controller, and proceeding only when all ping instructions have completed. One way of implementing a memory fence instruction is to maintain a counter of outstanding remote memory transactions, including cache misses and SNC requests. Each remote memory transaction results in an implicit or explicit acknowledgement. Acknowledgements returned to the issuing processor indicate successful completion of the corresponding remote memory transaction. An implicit acknowledgement can be assumed to return for memory transactions that return data values, such as a load instruction. An explicit acknowledgement is a special return message that is implemented for other memory transactions such as store instructions that do not necessarily return a value.

Another type of instruction that can be used to implement various synchronization protocols is a read-and-set instruction. This instruction sends a request to perform a read operation followed by a write operation at a provided memory address. Both the read and write operations occur in one atomic memory transaction (no other memory access of the memory address is allowed to interrupt the read and the write of that memory address). In response to the request from a read-and-set instruction, the memory sends the data value that is read to the originator of the request. In some cases, the value that is written is a predetermined value and does not necessarily need to be sent along with the request.

The read-and-set synchronization operation is only one example of a synchronization operation. There are others such as test-and-set, fetch-and-add, fetch-and-increment, load locked store conditional, and so on, each of which corresponds to multiple memory operations occurring in an atomic manner on a memory.

The read-and-set instruction can be performed with respect to a memory address in an external memory module, or with respect to a memory address in a tile's cache (e.g., using the SNC mode). A default target address of the read-and-set instruction may be stored on the requesting tile. The request and response associated with the read-and-set instruction can be used to implement various synchronization operations.

For example, a processor issues an instruction (e.g., a read-and-set instruction) on a given tile to perform a synchronization operation with respect to a memory address on another tile or in an external memory. In response to the instruction the tile generates a message with appropriate control bits indicating the specific synchronization operation to be performed. The message is sent over the network to the target tile (in the case of an on-tile memory) or memory controller (in the case of an external memory). The target tile, for example, receives the message, interprets the synchronization operation based on the control bits, and performs the atomic sequence of memory operations on its local memory. The target tile then sends the result in a message back to the requesting tile.

When an uncached memory access occurs or a cache miss occurs, copious memory is accessed to acquire the desired data. Because copious memory can be distributed across the system over multiple external memory modules, an entity requesting memory access maps a physical address to memory address within an external memory module and the tile to which that external memory module is coupled.

In a first approach to mapping physical addresses to external memory modules, a TLB stores the mapping by providing the sufficient information directly in the physical address. For example, the mapping uses a portion of the physical address (e.g., the upper bits) as network destination information (e.g., a MDN network address including the X and Y locations and final destination) to identify the tile and port to which the memory module is coupled, and another portion of the physical address (e.g., the lower bits) as the address within the memory module. An operating system may be responsible for determining the physical addresses to be stored in the TLBs in a way that the correct memory controller is reached for a given physical address. As described above, this physical memory mapping can also be overridden by a location override in a TLB.

In another approach, an additional translation procedure can be used to more efficiently map a portion of a 64-bit physical memory address to the needed network destination information. For example, in a case in which there are a maximum of N memory modules that can be coupled to the tile array, the top $\lceil \log_2 N \rceil$ bits of the physical address can be used as a memory ID to indicate one of the N memory modules to which the physical memory address can be mapped. The memory ID is then used as an index into a table that provides the network destination information. The table can be stored, for example, in one or more SPR locations. Alternatively, the table can store other intermediate information from which the network destination information can be derived. Alternatively, a logic function can transform the memory ID into the network destination information.

9.3 DMA Engine

The DMA engine 806 (see FIG. 8) can provide efficient prefetching and preflushing of data. In many applications, the application may know the ordering of memory addresses that will be accessed. In these cases, the data may also reside in off-tile (e.g., in copious memory). Using the DMA engine 806, a tile may bring data into its cache before the data is needed. The DMA engine 806 performs prefetch and preflush memory transfers based on a memory access history of the main processor. By prefetching data, the main processor reads the data directly from its cache and avoids the stalls and latency involved with retrieving the data from copious memory when it is used.

Likewise, preflush in the DMA engine 806 writes dirty data back to copious memory before the data would be naturally evicted. Preflushing allows the time that is required to flush the dirty unneeded data to copious memory to be scheduled when it is convenient for the application. Also, by preflushing, cache pollution can be reduced.

The transactions supported by the DMA engine 806 include "tile-to-memory" transactions that communicate between a tile's cache and a copious memory controller, and "tile-to-tile" transactions that occur between two tiles. The DMA engine 806 can perform tile-to-tile transactions to transfer data between cached or non-cached memory locations in the tiles. For example, the DMA engine 806 can transfer a cache line from a first cache to a second cache and invalidate the cache line in the first cache to maintain a single valid cached copy of the data. The DMA engine 806 can also transfer data to or from a pinned portion of a tile's local memory configured to be protected from eviction by cached data (e.g., using a red-black cache as described above). In some implementations the DMA engine 806 is configured to transfer data to a tile after determining that access to the tile's memory is allowed (e.g., using the protection mechanisms described above).

The DMA engine 806 can also perform synchronization operations by sending messages to a copious memory controller or to another DMA engine 806.

Access to the DMA engine 806 is protected through the used of a DMA translation lookaside buffer (DMATLB) and a DMA location lookaside buffer (DMALLB). The DMATLB is similar to the main processor's DTLB. One implementation of the DMATLB uses the same format as the DTLB except that location override is not used. In addition to virtual address to physical address translations for pages, a TLB can also store protection information. Protection information indicates whether the running process is allowed to access a given page. If it is not, then the tile can signal an interrupt to the operating system, and the operating system can respond to the attempted access appropriately (e.g., by killing the process).

In a similar way, DMA can protect both the memory addresses accessed and the tile accessed in a DMA transaction. The DMALLB provides additional protection when a DMA engine targets another tile. The DMALLB identifies tiles that are allowed to be contacted by the DMA engine. The DMALLB can be used, for example, to restrict DMA access from predetermined tiles. The DMALLB can be managed in a similar manner to a TLB.

For example, to protect tiles from one another, the DMATLB or DMALLB can store tile identifiers and a protection level associated with each tile. The DMA transaction (e.g., a DMA transaction that sends data from a local memory to a remote tile's memory) can include both a remote tile identifier and source and destination address ranges. The remote tile identifier is presented to the DMATLB or DMALLB and the tile determines whether the source process is allowed to send data to that tile. If not, then a protection violation occurs.

9.4 Preflush

One type of tile-to-memory transaction is a preflush transaction that enables a DMA engine 806 to move data from the cache into copious memory. By flushing data to copious memory and subsequently performing a memory ping synchronization operation, described below, a tile can ensure that data has successfully been stored into copious memory. Alternatively, other types of synchronization operations can be used, such as a memory-fence instruction.

One use of a preflush transaction is to push data that is not going to be used in the near future into memory. This increases the number of clean entries in the cache, reducing the number of cache entries that would potentially need to be flushed when further data is brought into the cache.

If some or all of the addresses that are to be flushed do not reside in the cache, or if the addresses that are to be flushed are not dirty in the cache, the data is not flushed to memory and the tile-to-memory transaction skips those addresses.

The programmatic interface to tile-to-memory transactions is capable of taking byte aligned addresses to operate on. While the interface operates on a byte granularity, tile-to-memory transactions flush data on a cache line basis. If a single byte on a cache line is to be flushed, the entire cache line is flushed.

9.5 Prefetch

Another type of tile-to-memory transaction is a prefetch transaction that enables a DMA engine 806 to move data from copious memory into the cache. A prefetch transaction can be used to move data from memory to a tile's cache, before it is used. The DMA engine provides an independent thread of control to move data into a tile's cache freeing the main processor to execute a programs instructions. Care should still be taken in deciding to use a prefetch transaction due to the possibility of a prefetch evicting data from a cache that may be more critical to the program's execution than the data that is being prefetched.

The memory-to-tile transaction of the DMA engine use a start address and length to request a memory range from copious memory. If a cache line is valid in the cache currently, the DMA engine does not perform a read from main memory. This prevents dirty data from being overwritten by data coming from copious memory. Prefetch transactions can start at any address, but will prefetch an entire cache line if the start address is not aligned with the start of a cache line. Likewise, the length of a memory-to-tile prefetch is configurable to byte boundaries, but the length is padded to prefetch entire cache lines.

As an alternative, a bulk DMA memory transfer transaction can be performed with more of the function being performed in software. For example, the processor is configured to a prefetch instruction. We distinguish this prefetch instruction from the DMA prefetch operation in that the prefetch instruction is a single instruction issued by the processor. The prefetch instruction is similar to a load instruction, except that the value is not returned into one of the processor registers. (Alternatively, the value can be returned into a nonwritable register.) The effect of a prefetch instruction is that the corresponding cache line is fetched into the cache from external memory in anticipation of a future load instruction. Multiple prefetch instructions can be issued by the processor, and they can run in the background, so that multiple outstanding memory operations can be in flight at the same time.

A DMA prefetch operation can be implemented by synthesizing the DMA prefetch operation by issuing multiple prefetch instructions. The user can see just an abstract instrinsic instruction or macro instruction called DMA prefetch as a library call. The software in turn replaces the DMA prefetch macro by a sequence of prefetch instructions. Optional synchronization operations can be appended to the above sequence to let the processor know when the synthesized DMA prefetch operation is complete.

Similarly, a preflush instruction can be implemented and DMA preflush operations can be synthesized using sequences of preflush instructions.

9.6 Memory Ping Synchronization

A tile may need to determine when data has been successfully written to copious memory. Simply executing a DMA flush transaction is not sufficient to know that another tile can safely read the flushed data from memory. Completion of a tile-to-memory operation signals that data has left a tile, but there is a latency associated with data reaching copious memory. In order to determine when data has successfully reached copious memory and can be reliably read from copious memory, a DMA memory ping synchronization transaction is used.

A memory ping transaction sends a ping packet over the MDN to one or more copious memory controllers. When a copious memory controller processes the ping packet, it responds with a ping response to the sending tile. The copious memory controller processes the ping packet after all previous DMA store operations from the sending tile have been committed to copious memory. This ordering ensures that data has successfully reached and posted to copious memory.

The DMA memory ping synchronization transaction uses a start location and a length. The length is used to determine whether a DMA transactions straddles page boundaries. Different pages may reside in different memory controllers. Thus, if a DMA transaction flushes a range of data to multiple copious memory controllers, all of these controllers are pinged to ensure that data has successfully posted to the respective controllers.

A tile-to-tile ping transaction provides a memory serializing event on a remote, pinged tile. After any outstanding memory transactions that may be queued on the remote tile's DMA engine are posted to the remote cache, the remote tile responds with a ping response to the sending tile.

Various features of the tiled integrated circuit architecture and programming described herein can be implemented by modifying versions of the tiled integrated circuits described in U.S. patent application Ser. Nos. 11/302,956 or 11/314,861, or in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

Various techniques described herein can be implemented in additional types of integrated circuit architectures. For example, some techniques can be used in an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units.

It is to be understood that the foregoing description is intended to illustrate and not to limit the scope of the invention, which is defined by the scope of the appended claims. Other embodiments are within the scope of the following claims.

What is claimed is:

1. An integrated circuit, comprising:
    a plurality of tiles, each tile comprising
        a processor,
        a switch including switching circuitry to forward data received over data paths from other tiles to the processor and to switches of other tiles, and to forward data received from the processor to switches of other tiles, according to a switch instruction indicating an input port to which each of multiple output ports of the switch is to be coupled, and
        a translation lookaside buffer coupled to the switch to translate virtual memory addresses of switch instructions to physical memory addresses of the switch instructions;
        wherein the processor is a pipelined processor and the switching circuitry is coupled to a plurality of stages of the pipeline.

2. The integrated circuit of claim 1, wherein each tile further comprises a translation lookaside buffer coupled to the processor to translate virtual memory addresses of processor instructions to physical memory addresses of the processor instructions.

3. The integrated circuit of claim 1, wherein the switching circuitry is coupled to bypass paths that connect non-adjacent pipeline stages of the processor.

4. The integrated circuit of claim 1, wherein the switching circuitry is coupled to a buffer accessible by the processor.

5. The integrated circuit of claim 4, wherein the switching circuitry is coupled to a buffer accessible within a register name space of the processor.

6. The integrated circuit of claim 4, wherein the switching circuitry is coupled to a buffer accessible within a memory address space of the processor.

7. The integrated circuit of claim 4, wherein the switching circuitry is coupled to a buffer accessible within an input/output device name space of the processor.

8. The integrated circuit of claim 4, wherein the buffer comprises an input buffer configured to receive data over an input port of the switch.

9. The integrated circuit of claim 4, wherein the buffer comprises an output buffer configured to send data over an output port of the switch.

10. An integrated circuit, comprising:
    a plurality of tiles, each tile comprising
        a processor,
        a switch including switching circuitry to forward data received over data paths from other tiles to the processor and to switches of other tiles, and to forward data received from the processor to switches of other tiles, and
        a memory interface coupled to at least one of the processor and the switch, configured to combine partial memory addresses to provide a physical memory address in a first mode, and configured to translate a virtual memory address to a physical memory address in a second mode.

11. The integrated circuit of claim 10, wherein combining partial memory addresses to provide a physical memory address comprises concatenating low order bits with high order bits to provide a physical memory address.

12. The integrated circuit of claim 11, wherein the low order bits comprise a virtual memory address.

13. The integrated circuit of claim 10, wherein the memory interface comprises a translation lookaside buffer configured to store information for translating a virtual memory address to a physical memory address.

14. The integrated circuit of claim 13, wherein the memory interface is configured to update information stored in the translation lookaside buffer in response to a translation fault.

15. The integrated circuit of claim 10, wherein the memory interface comprises a multiplexer configured to select a combined physical memory address or a translated physical memory address based on a signal indicating the first or the second mode.

16. An integrated circuit, comprising:
    a plurality of tiles, each tile comprising
        a processor,
        a switch including switching circuitry to forward data received over data paths from other tiles to the processor and to switches of other tiles, and to forward data received from the processor to switches of other tiles,
        a memory coupled to the processor,
        a cache manager including circuitry to transfer data between the memory and an external memory through the switch, and
        a direct memory access engine coupled to the processor and including circuitry to transfer data between the memory and the external memory through the switch;
        wherein the switch comprises multiple switch points each including respective switching circuitry to forward data over respective data paths and the cache manager and the direct memory access engine are coupled to a common switch point and the common switch point is reserved for transferring data among memories of tiles and one or more external memories coupled to the tiles.

17. The integrated circuit of claim 16, wherein switching circuitry for the common switch point is configured to forward data based at least in part on information included in the data to be forwarded.

18. The integrated circuit of claim 16, wherein the cache manager comprises a state machine configured to transfer cache lines between the memory and the external memory.

19. The integrated circuit of claim 18, wherein the direct memory access engine is configured to transfer multiple cache lines between the memory and the external memory.

20. The integrated circuit of claim 19, wherein the direct memory access engine is configured to transfer multiple cache lines in response to a request received from the processor.

21. The integrated circuit of claim 19, wherein the direct memory access engine is configured to fetch data from the external memory to the memory based on memory access history of the processor.

22. The integrated circuit of claim 19, wherein the direct memory access engine is configured to flush data from the memory to the external memory based on memory access history of the processor.

23. An integrated circuit, comprising:
a plurality of tiles, each tile comprising
a processor,
a switch including switching circuitry to forward data received over data paths from other tiles to the processor and to switches of other tiles, and to forward data received from the processor to switches of other tiles,
a memory coupled to the processor,
a direct memory access engine including circuitry to transfer data between the memory and a memory external to the tile through the switch, and
a translation look-aside buffer coupled to the direct memory access engine to translate virtual memory addresses to physical memory addresses;
wherein the processor is a pipelined processor and the switching circuitry is coupled to a plurality of stages of the pipeline.

24. The integrated circuit of claim 23, wherein the switching circuitry is coupled to bypass paths that connect non-adjacent pipeline stages of the processor.

25. The integrated circuit of claim 23, wherein the switching circuitry is coupled to a buffer accessible by the processor.

26. The integrated circuit of claim 25, wherein the switching circuitry is coupled to a buffer accessible within a register name space of the processor.

27. The integrated circuit of claim 25, wherein the switching circuitry is coupled to a buffer accessible within a memory address space of the processor.

28. The integrated circuit of claim 25, wherein the switching circuitry is coupled to a buffer accessible within an input/output device name space of the processor.

29. The integrated circuit of claim 25, wherein the buffer comprises an input buffer configured to receive data over an input port of the switch.

30. The integrated circuit of claim 25, wherein the buffer comprises an output buffer configured to send data over an output port of the switch.

31. A method for processing instructions in an integrated circuit, the integrated circuit comprising a plurality of tiles, each tile comprising a processor and a switch, the method comprising:
processing instructions in a processor of a tile;
forwarding data received over data paths from other tiles to the processor and to switches of other tiles, and forwarding data received from the processor to switches of other tiles, according to a switch instruction indicating an input port to which each of multiple output ports of the switch is to be coupled; and
translating virtual memory addresses of switch instructions to physical memory addresses of the switch instructions;
wherein the processor is a pipelined processor and the switching circuitry is coupled to a plurality of stages of the pipeline.

32. A method for processing instructions in an integrated circuit, the integrated circuit comprising a plurality of tiles, each tile comprising a processor and a switch, the method comprising:
processing instructions in a processor of a tile;
forwarding data received over data paths from other tiles to the processor and to switches of other tiles, and forwarding data received from the processor to switches of other tiles; and
based on information indicating either a first mode or a second mode, combining partial memory addresses to provide a physical memory address in the first mode, and translating a virtual memory address to a physical memory address in the second mode.

33. A method for processing instructions in an integrated circuit, the integrated circuit comprising a plurality of tiles, each tile comprising a processor, a switch, and a memory coupled to the processor, the method comprising:
processing instructions in a processor of a tile;
forwarding data received over data paths from other tiles to the processor and to switches of other tiles, and forwarding data received from the processor to switches of other tiles;
transferring data between the memory and an external memory through the switch according to a caching scheme to maintain a cache for the tile; and
transferring data between the memory and the external memory through the switch according to a direct memory transfer scheme to transfer data while the processor is performing another task;
wherein the switch comprises multiple switch points each including respective switching circuitry to forward data over respective data paths and the cache manager and the direct memory access engine are coupled to a common switch point, and the common switch point is reserved for transferring data among memories of tiles and one or more external memories coupled to the tiles.

34. A method for processing instructions in an integrated circuit, the integrated circuit comprising a plurality of tiles, each tile comprising a processor, a switch and a local memory coupled to the processor, the method comprising:
processing instructions in a processor of a tile;
forwarding data received over data paths from other tiles to the processor and to switches of other tiles, and forwarding data received from the processor to switches of other tiles; and
transferring data between the local memory and memory of another tile through the switch according to a direct memory transfer scheme to transfer data while the processor is performing another task.

35. The method of claim 34, wherein each tile further comprises an interface coupled to the processor and a direct memory access engine that enables the processor to identify data to be transferred by the direct memory access engine.

36. The method of claim 35, wherein the interface comprises at least one register that the processor writes to and the direct memory access engine reads from.

37. The method of claim 34, wherein the direct memory access engine communicates with a direct memory access engine of the other tile to transfer the data.

38. The method of claim 34, wherein the local memory and the memory of the other tile each include at least some memory locations configured as a cache for data from an external memory coupled to the tiles.

39. The method of claim 38, wherein the transferred data comprises a cache line.

40. The method of claim 39, wherein the direct memory access engine is configured to invalidates a cache line that is transferred to another tile.

41. The method of claim 38, wherein the local memory comprises multiple memories configured as multiple levels in a multi-level cache.

42. The method of claim 41, further comprising updating multiple levels in the local memory when the processor writes data into the multi-level cache.

43. The method of claim 38, wherein the direct memory access engine is configured to transfers data into a portion of the local memory configured to be protected from eviction by cached data from the external memory.

44. The method of claim 34, wherein the direct memory access engine is configured to transfers data between the local memory and memory of the other tile after determining whether the transfer is allowed.

45. The method of claim 44, wherein determining whether the transfer is allowed comprises determining whether access to a source location of the data is allowed.

46. The method of claim 44, wherein determining whether the transfer is allowed comprises determining whether access to a destination location of the data is allowed.

47. The method of claim 46, wherein determining whether access to a destination location of the data is allowed comprises determining whether access to the memory of the other tile is allowed.

48. The method of claim 44, wherein the direct memory access engine includes a buffer storing information identifying a plurality of tiles and information indicating whether access to an identified tile is allowed.

49. A method for processing instructions in an integrated circuit, the integrated circuit comprising a plurality of tiles, each tile comprising a processor, a switch, and a memory coupled to the processor, the method comprising:

processing instructions in a processor of a tile;

forwarding data received over data paths from other tiles to the processor and to switches of other tiles, and forwarding data received from the processor to switches of other tiles;

transferring data between the memory coupled to the processor and a memory external to the tile through the switch according to a direct memory transfer scheme to transfer data while the processor is performing another task; and translating virtual memory addresses to be transferred according to the direct memory access transfer scheme to physical memory addresses;

wherein the processor is a pipelined processor and the switching circuitry is coupled to a plurality of stages of the pipeline.

* * * * *